United States Patent
El Ghali et al.

(10) Patent No.: US 11,370,610 B2
(45) Date of Patent: Jun. 28, 2022

(54) TRANSPORT SHUTTLE FOR A GOODS STORAGE AND DISTRIBUTION SYSTEM

(71) Applicant: COLIB, Paris (FR)

(72) Inventors: Malek El Ghali, Paris (FR); Nicolas Barattolo, Orange (FR)

(73) Assignee: COLIB, Paris (FR)

( * ) Notice: Subject to any disclaimer, the term of this patent is extended or adjusted under 35 U.S.C. 154(b) by 0 days.

(21) Appl. No.: 16/961,492

(22) PCT Filed: Jan. 10, 2019

(86) PCT No.: PCT/FR2019/050046
§ 371 (c)(1),
(2) Date: Jul. 10, 2020

(87) PCT Pub. No.: WO2019/138189
PCT Pub. Date: Jul. 18, 2019

(65) Prior Publication Data
US 2020/0385206 A1 Dec. 10, 2020

(30) Foreign Application Priority Data
Jan. 10, 2018 (FR) ...................................... 1850195

(51) Int. Cl.
*B65G 1/04* (2006.01)
*G07F 11/16* (2006.01)

(52) U.S. Cl.
CPC .......... *B65G 1/0435* (2013.01); *G07F 11/165* (2013.01)

(58) Field of Classification Search
CPC .............. B65G 1/0435; H01L 21/6773; H01L 21/67742
See application file for complete search history.

(56) References Cited

U.S. PATENT DOCUMENTS 3,809,259 A * 5/1974 Pipes ................... B65G 1/0435
414/280
3,883,008 A * 5/1975 Castaldi ............... B65G 1/0435
414/270
(Continued)

FOREIGN PATENT DOCUMENTS

DE 3633508 A1 4/1988
EP 0116126 A1 8/1984
(Continued)

OTHER PUBLICATIONS

International Search Report, dated Apr. 12, 2019, from corresponding PCT application No. PCT/FR2019/050046.
(Continued)

*Primary Examiner* — Kaitlin S Joerger
(74) *Attorney, Agent, or Firm* — Nixon & Vanderhye

(57) ABSTRACT

A shuttle for handling and transporting goods, including: a receiving base suitable for receiving a removable support for goods; a gripper suitable for cooperating with the removable support, the gripper being movable relative to the receiving base; and an extension system connected to the gripper, for moving the removable support on the receiving base. The extension system moves the gripper along a transverse axis while remaining parallel to itself, between retracted position, a first protruding position, and a second protruding position opposite the first protruding position with respect to the retracted position.

19 Claims, 19 Drawing Sheets

(56) References Cited

U.S. PATENT DOCUMENTS

| | | | | |
|---|---|---|---|---|
| 3,999,823 | A | * 12/1976 | Di Liddo | B65G 1/0435 |
| | | | | 312/268 |
| 5,022,811 | A | * 6/1991 | Wallman | B66F 9/195 |
| | | | | 414/607 |
| 5,085,553 | A | * 2/1992 | Bouwens | H05K 13/086 |
| | | | | 414/331.1 |
| 5,558,483 | A | * 9/1996 | Masuda | B66F 9/07 |
| | | | | 414/278 |
| 9,592,759 | B1 | 3/2017 | Theobald | |
| 10,188,013 | B1 | * 1/2019 | Gold | H05K 7/1489 |
| 2016/0068372 | A1 | * 3/2016 | Kashihara | B65G 1/06 |
| | | | | 414/751.1 |
| 2017/0066591 | A1 | * 3/2017 | Torazawa | B65G 1/0435 |
| 2018/0339858 | A1 | * 11/2018 | Iwata | B65G 41/003 |
| 2019/0210802 | A1 | * 7/2019 | Ueda | B65G 1/0407 |

FOREIGN PATENT DOCUMENTS

| | | | |
|---|---|---|---|
| FR | 2705955 A1 * | 12/1994 | ................ B66F 9/07 |
| JP | S6175706 A | 4/1986 | |
| JP | S6231630 A | 2/1987 | |
| JP | H10315178 A | 12/1998 | |
| JP | 2008-074550 A | 4/2008 | |

OTHER PUBLICATIONS

Written Opinion, dated Apr. 12, 2019, from corresponding PCT application No. PCT/FR2019/050046.

* cited by examiner

TRANSPORT SHUTTLE FOR A GOODS STORAGE AND DISTRIBUTION SYSTEM

TECHNICAL FIELD

This relates to systems which enable handling for the storage and distribution of goods, and more particularly to automated systems.

PRIOR ART

The technological evolution of telecommunications and personal computing has been accompanied by a transformation of our consumption habits. A growing share of our purchases is now carried out on the Internet. The delivery of the goods may take place at home, or away from home at a collection point. The collection points themselves are evolving to become more and more automated thanks to locker pickup points which allow end customers to collect their goods autonomously using a code associated with their order. However, it has been reported that when all lockers of a pickup point are full, in actuality 80% of the storage space remains empty due to the difference between the volume of the lockers and that of the parcels. In urbanized areas, where space is limited, an improvement to this type of system is desirable.

SUMMARY

A shuttle for handling and transporting goods is proposed, comprising: a receiving base suitable for receiving a removable support for goods; a gripper suitable for cooperating with the removable support, the gripper being movable relative to the receiving base; and an extension system connected to the gripper, for moving the removable support on the receiving base; characterized in that the extension system moves the gripper along a transverse axis while remaining parallel to itself, between a retracted position, a first protruding position, and a second protruding position opposite the first protruding position with respect to the retracted position.

The features described in the following paragraphs may optionally be implemented. They may be implemented independently of each other or in combination with one another:

- a longitudinal direction of the gripper is perpendicular to the transverse axis,
- when the gripper is in the retracted position the shuttle has a base depth, when the gripper is in the first protruding position the shuttle has a first depth, when the gripper is in the second protruding position the shuttle has a second depth, the base depth and the first and second depths being calculated along the transverse axis, and the first and second depths being greater than the base depth,
- the first depth is equal to the second depth,
- the shuttle further comprises at least one guide element extending along the transverse axis, the extension system being movable in translation on said at least one guide element, a length of travel of the extension system along said at least one guide element being less than the first and second depths,
- when the extension system is at the end of its travel on said at least one guide element in a first extension direction along the transverse axis, the gripper is in the first protruding position, when the extension system is at the end of its travel on said at least one guide element in a second extension direction along the transverse axis, the gripper is in the second protruding position, and when the extension system is in the middle of its travel on said at least one guide element, the gripper is in the retracted position,
- the extension system comprises at least one pair of retractable arms rotatably connected to the gripper, a movement of said at least one pair of retractable arms being mechanically linked to the translational movement of the gripper along the transverse axis,
- each of the arms of said at least one pair of retractable arms is rotatably connected to the gripper, each of the arms of said at least one pair of retractable arms having a rectilinear travel position along the transverse axis and an associated retracted position,
- the arms of said at least one pair of retractable arms have different positions when the gripper is near the first and the second protruding positions,
- when the gripper is in the first protruding position, a first arm of said at least one pair of retractable arms is in the rectilinear position and a second arm of said pair is in the retracted position; when the gripper is in the second protruding position, the first arm of said pair of retractable arms is in the retracted position and the second arm of said pair is in the rectilinear position; and when the gripper is in the retracted position, the first and second arms of said pair of retractable arms are in the rectilinear position,
- said at least one guide element comprises a guide element associated with each of the arms of said pair, the guide elements constraining each of the arms of said at least one pair along the transverse axis, each of the guide elements having a length of travel that is less than the base depth of the shuttle,
- a combined action of the guide elements constrains each of the arms of said at least one pair along the transverse axis for a length of travel that is equal to the base depth of the shuttle,
- the extension system further comprises a prestressed spring arranged between each of the two arms of said at least one pair of retractable arms and the gripper, said at least one guide element acting against the effect of the prestressed springs,
- said at least one pair of retractable arms comprises a first pair of retractable arms connected to a first half of the gripper in the longitudinal direction of the gripper, and the extension system includes a second pair of retractable arms connected to a second half of the gripper in the longitudinal direction of the gripper,
- the receiving base is adjustable between at least a first position where the receiving base has a first span along a horizontal axis in order to accommodate removable supports of a first size, and at least a second position where the receiving base has a second span along the horizontal axis in order to accommodate removable supports of a second size larger than the first, the second span being larger than the first span, the horizontal axis being perpendicular to the transverse axis,
- the gripper extends along a horizontal axis perpendicular to the transverse axis, the gripper includes a movable support that is movable along a vertical axis relative to a base of the gripper, the vertical axis being perpendicular to the horizontal axis and to the transverse axis, and when the gripper moves along the transverse axis and the movable support is close to the base, the gripper is arranged vertically below the receiving base,
- the extension system includes a movable support that is movable in translation along the transverse axis relative to the receiving base, and said at least two arms are at least two hinged arms rotatably connected to the support and to the gripper, the hinged arms are symmetrical with respect to a transverse plane, the vertical plane being defined by the transverse axis and a vertical axis, each of the two hinged arms comprises a first arm connected to the support so as to rotate about a vertical axis of rotation, and a second arm connected to the first arm so as to rotate about a vertical axis of rotation; when the first arm rotates clockwise, the second arm rotates counterclockwise to the first arm, the shuttle also comprises cogwheels coupling the first arm to the second arm, an amplitude of rotation of the first arm is multiplied at the second arm by the cogwheels, the translation along the transverse axis of the support in the first extension direction causes a proportionately increased translation of the gripper in this same direction between the retracted position and the first protruding position, and the translation along the transverse axis of the support in the second extension direction causes a proportionately increased translation of the gripper in this same direction between the retracted position and the second protruding position.

According to another aspect, also proposed is a goods storage and distribution module comprising: an enclosure defining an interior and an exterior, the enclosure comprising an interaction window capable of selectively opening so as to place the interior of the enclosure in communication with the exterior in order to receive goods; a goods storage and distribution system arranged inside the enclosure and comprising: a goods transport system including: movement rails extending along a vertical axis and along a horizontal axis, the movement rails being located in a movement passage extending in a vertical plane defined by the vertical axis and the horizontal axis; and a transport shuttle connected to said movement rails and being capable of bidirectional movement within the vertical plane along the vertical axis and along the horizontal axis, the transport shuttle being capable of receiving and handling a removable support carrying a good, and a goods storage area generally extending in the vertical plane adjacent to the movement passage, the storage area including a plurality of dynamic shelving areas, each dynamic shelving area including a plurality of pairs of supporting elements capable of cooperating with a plurality of removable supports to form a plurality of goods storage spaces of adjustable height according to the size of the good to be housed therein, the height being defined along the vertical axis, characterized in that: the storage area includes at least a first chamber and a second chamber separated from each other by a partition that is at least partially thermally insulating, at least one of the first and second chambers being temperature-controlled, the partition including a selective opening.

The features described in the following paragraphs may optionally be implemented. They may be implemented independently of each other or in combination with one another:

the first chamber is at a first controlled temperature, the second chamber being at a second controlled temperature different from the first controlled temperature, the goods storage and distribution system further comprises: a service hatch in communication with the interaction window of the enclosure, the service hatch being capable of receiving a removable support containing a good, the service hatch being movable between the first chamber and the second chamber, and the transport shuttle being capable of cooperating with the movable service hatch in order to transfer the removable support containing the good between the service hatch and the transport shuttle, the service hatch is movable between the first chamber and the second chamber, through the selective opening of the partition, the goods storage area comprises a first storage portion in the first chamber and a second storage portion in the second chamber, the transport system is a first transport system of the first chamber, and the transport shuttle is a first transport shuttle of the first chamber, the module further comprising a second transport system in the second chamber, the second transport system including: movement rails extending along the vertical axis and along the horizontal axis, the movement rails being located in a movement passage extending in the vertical plane; and a second transport shuttle connected to said movement rails and being capable of bidirectional movement within the vertical plane along the vertical axis and along the horizontal axis, the second transport shuttle being capable of receiving and handling a removable support carrying a good, and the second transport shuttle being capable of cooperating with the service hatch in order to transfer the removable support containing the good between the service hatch and the second transport shuttle, the storage area includes a third chamber separated from the second chamber by a partition that is at least partially thermally insulating, the partition including a selective opening, the second chamber being located between the first chamber and the third chamber, the third chamber being at a third controlled temperature different from the first and second controlled temperatures, the first, second, and third temperatures forming a monotonic temperature gradient between the first, second, and third chambers, the module further comprising a third transport system in the third chamber, the third transport system including: movement rails extending along the vertical axis and along the horizontal axis, the movement rails being located in a movement passage extending in the vertical plane; and a third transport shuttle connected to said movement rails and being capable of bidirectional movement within the vertical plane along the vertical axis and along the horizontal axis, the third transport shuttle being capable of receiving and handling a removable support carrying a good, and the third transport shuttle being capable of cooperating with the service hatch in order to transfer the removable support containing the good between the service hatch and the third transport shuttle, the control unit further comprises a control unit configured to control the movement of the transport shuttle on the movement rails, and the selective opening of the partition to allow the passage of the transport shuttle between the first chamber and the second chamber, the service hatch comprises a first closable opening arranged on one side of the service hatch opposite the interaction window, and a second closable opening arranged on another side of the service hatch face to face with the transport shuttle, the movement rails include a pair of fixed rails and at least one movable rail connected at its ends to the fixed rails, the movable rail moving bidirectionally along the fixed rails, the pair of fixed rails extending along the horizontal axis or vertical axis, and said movable rail extending along the other of the horizontal axis or vertical axis; and the transport shuttle is connected to said movable rail so as to be able to move bidirectionally along said movable rail, each storage space is defined vertically between two adjacent removable supports, and the removable supports have a plurality of possible vertical positions in each dynamic shelving area according to their connection to a given pair of supporting elements, the goods storage area includes a first storage area generally extending in the vertical plane, and a second storage area generally extending in the vertical plane and arranged facing the first storage area, such that the movement passage is defined transversely between the first and second storage areas, the ends of the supporting elements internal to a same pair are aligned horizontally so that when a removable support is connected to a pair of supporting elements it forms a lower boundary of a storage space, the plurality of dynamic shelving areas includes a first plurality of dynamic shelving areas having a first width and a second plurality of dynamic shelving areas having a second width, the second width being different from the first width, the first width and the second width being defined along the horizontal axis, the first plurality of dynamic shelving areas cooperating with a first plurality of removable supports of a first size having a side substantially of the first width, and the second plurality of dynamic shelving areas cooperating with a second plurality of removable supports of a second size having a side substantially of the second width, the transport shuttle comprises: a receiving base suitable for receiving a removable support for goods; a gripper suitable for cooperating with the removable support and movable relative to the receiving base; and an extension system connected to the gripper in order to move the removable support on the receiving base, the extension system moving the gripper along a transverse axis, while remaining parallel to itself, between a retracted position, a first protruding position, and a second protruding position opposite the first protruding position with respect to the retracted position, the extension system of the shuttle comprises at least one pair of retractable arms rotatably connected to the gripper, a movement of said at least one pair of retractable arms being mechanically linked to the translational movement of the gripper along the transverse axis, each of the arms of said at least one pair of retractable arms being rotatably connected to the gripper and having a rectilinear travel position along the transverse axis and an associated retracted position, the arms of said at least one pair of retractable arms having different positions when the gripper is near the first and the second protruding positions, the receiving base of the shuttle is adjustable between a first position where the receiving base has a first span along a horizontal axis in order to accommodate removable supports of a first size, and a second position where the receiving base has a second span along the horizontal axis in order to accommodate removable supports of a second size larger than the first, the second span being larger than the first span, the horizontal axis being perpendicular to the transverse axis.

According to another aspect, also provided is a goods storage and distribution system comprising: a goods transport system including: movement rails including a pair of fixed rails and at least one movable rail connected at its ends to the fixed rails and moving bidirectionally along them, the pair of fixed rails extending along one of a horizontal axis and a vertical axis, and said movable rail extending along the other of the horizontal axis and vertical axis, the movement rails being located in a movement passage extending in a vertical plane, the vertical plane being defined by the horizontal axis and the vertical axis; and a transport shuttle connected to said movable rail so as to be able to move bidirectionally along said movable rail, the transport shuttle being capable of receiving and handling a removable support; and a goods storage area generally extending in the vertical plane adjacent to the movement passage, the storage area including a plurality of dynamic shelving areas, each dynamic shelving area including a plurality of pairs of supporting elements arranged vertically relative to each other, the pairs of supporting elements being capable of cooperating with a plurality of removable supports in order to selectively connect them to the pairs of supporting elements by the transport shuttle so as to form a plurality of goods storage spaces, each storage space being defined vertically between two adjacent removable supports, each of the storage spaces having a height that is adjustable according to the size of the good to be housed therein, the height being defined along the vertical axis, the removable supports having a plurality of possible vertical positions in each dynamic shelving area according to their connection to a given pair of supporting elements, characterized in that: the plurality of dynamic shelving areas includes a first plurality of dynamic shelving areas having a first width and a second plurality of dynamic shelving areas having a second width, the second width being different from the first width, the first width and the second width being defined along the horizontal axis.

The features described in the following paragraphs may optionally be implemented. They may be implemented independently of each other or in combination with one another:

the transport shuttle includes an extension system having two positions: in a neutral position, the transport shuttle has a base depth less than or equal to a depth of the movement passage, the depth being defined along a transverse axis, the transverse axis being perpendicular to the horizontal and vertical axes; and in a first extended position, the transport shuttle has a first depth greater than the depth of the movement passage to enable transferring a removable support from the transport shuttle to a pair of supporting elements, the goods storage area comprises a first storage area generally extending in the vertical plane, and a second storage area generally extending in the vertical plane and arranged facing the first storage area, such that the movement passage is defined transversely between the first and second storage areas, the extension system also has a second extended position: in the second extended position the transport shuttle has a second depth greater than the depth of the movement passage, the first extended position, second extended position, and neutral position being aligned, and the neutral position being located between the first extended position and the second extended position, the storage area includes at least one temperature-controlled chamber separated from the rest of the storage area by a partition having a selective opening, the storage area includes a plurality of temperature-controlled chambers adjacent to each other and arranged with respect to each other so as to form a monotonic temperature gradient of the controlled temperatures, the chambers of the plurality of temperature-controlled chambers being separated from each other by partitions having a selective opening, the ends of the supporting elements internal to a same pair are aligned horizontally so that when a removable support is connected to a pair of supporting elements it forms a lower boundary of a storage space, the first plurality of dynamic shelving areas cooperate with a first plurality of removable supports of a first size having a side substantially of the first width, and the second plurality of dynamic shelving areas cooperate with a second plurality of removable supports of a second size having a side substantially of the second width, the transport shuttle includes a receiving base suitable for receiving removable supports of a first size and removable supports of a second size larger than the first size, the receiving base being adjustable between a first position where the receiving base has a first span along the horizontal axis in order to accommodate removable supports of the first size, and a second position where the receiving base has a second span along the horizontal axis in order to accommodate removable supports of the second size, the second span being larger than the first span, the transport shuttle includes: a receiving base suitable for receiving a removable support; a gripper suitable for connecting the removable support to the transport shuttle; and an extension system connected to the gripper in order to move the removable support on the receiving base in a first direction along a transverse axis and in a second direction opposite to the first direction along the transverse axis, the transverse axis being perpendicular to the horizontal axis and the vertical axis, the extension system moving the gripper between the neutral position, the first extended position in the first direction relative to the neutral position, and a second extended position in the second direction relative to the neutral position, without rotation of the transport shuttle; in the neutral position, the transport shuttle has the base depth, in the first extended position the transport shuttle has the first depth, in the second extended position the transport shuttle has a second depth, the depths being calculated along the transverse axis, the first and second depths being greater than the base depth.

Other features and advantages will be apparent from the following description of one of these embodiments, given as a non-limiting example with reference to the accompanying drawings.

FIGURES

Figure 10:
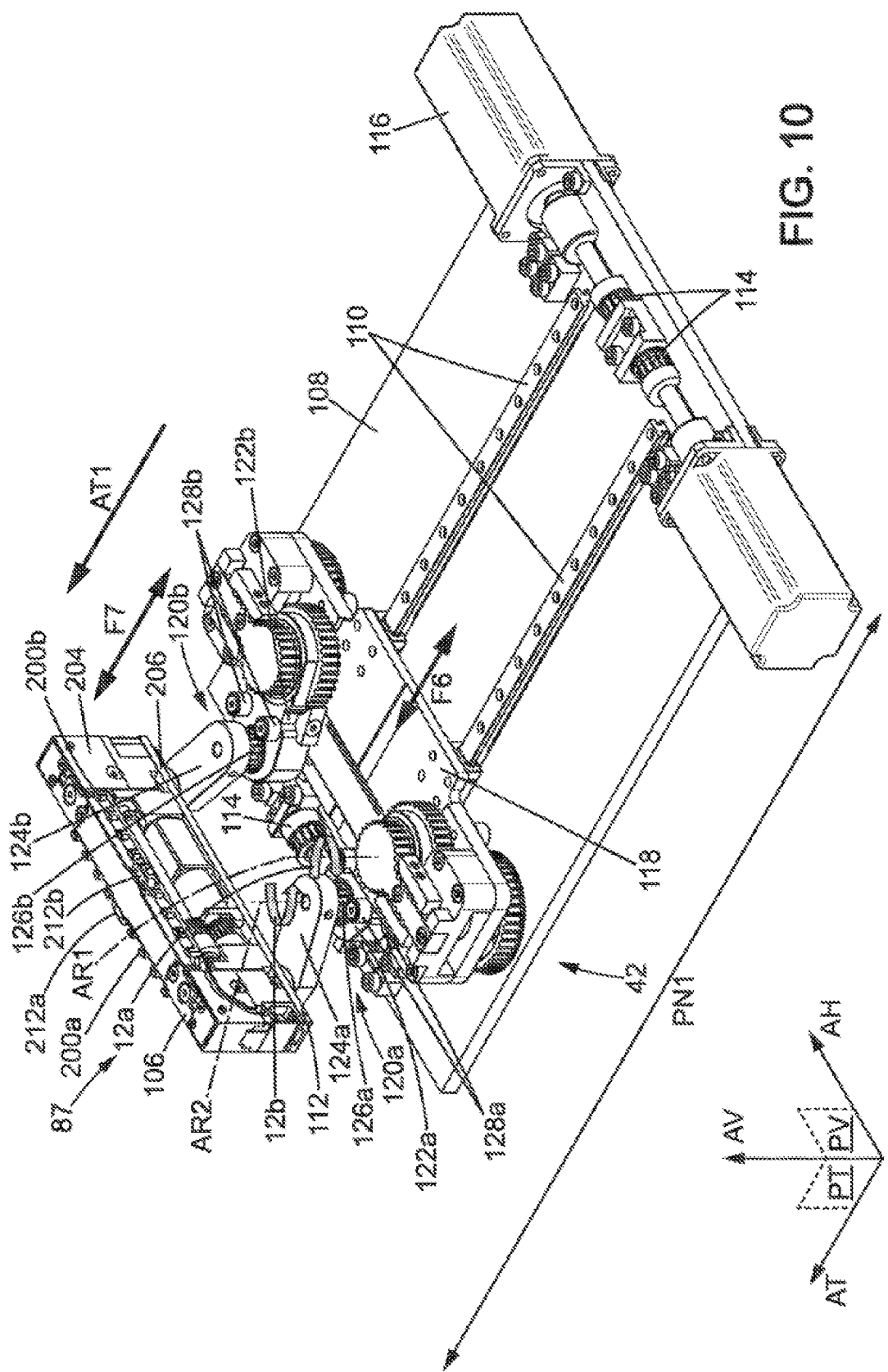
FIG. 10 is a schematic perspective view of a portion of the transport shuttle of FIG. 9, with the extension system shown in a first extended position to be able to hook a removable support.
Figure 13:
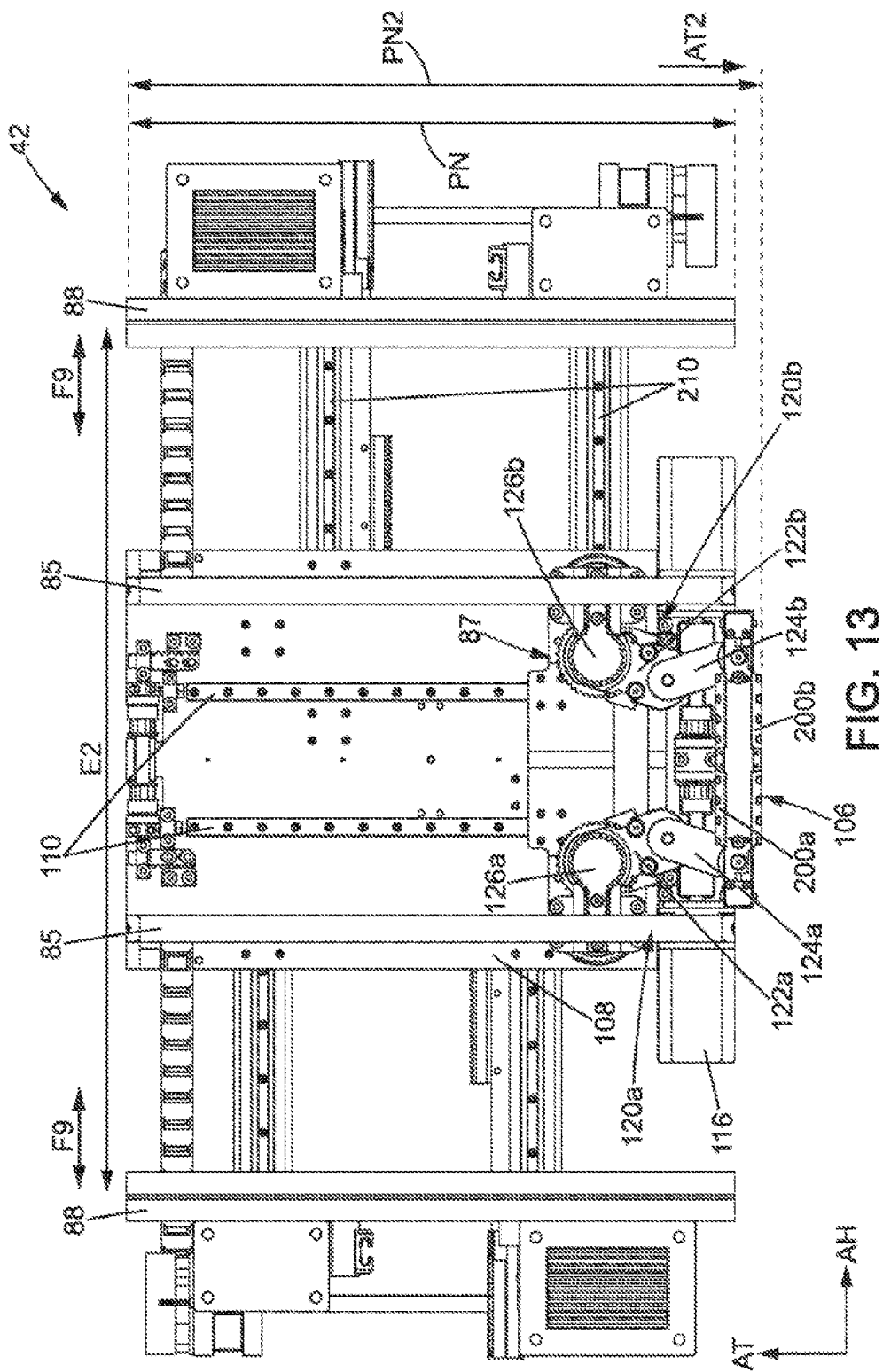
Figure 14A:
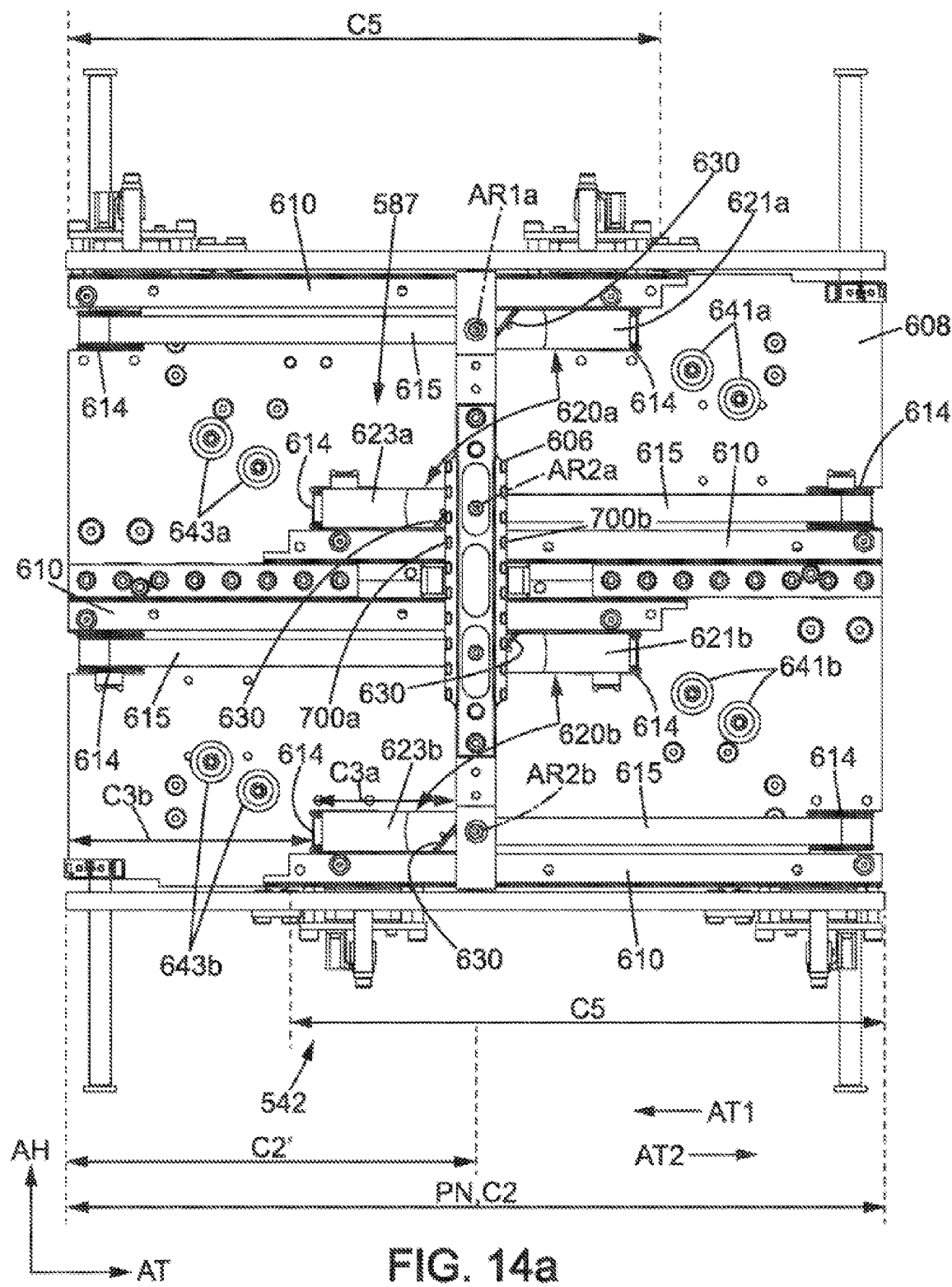
Figure 14B:
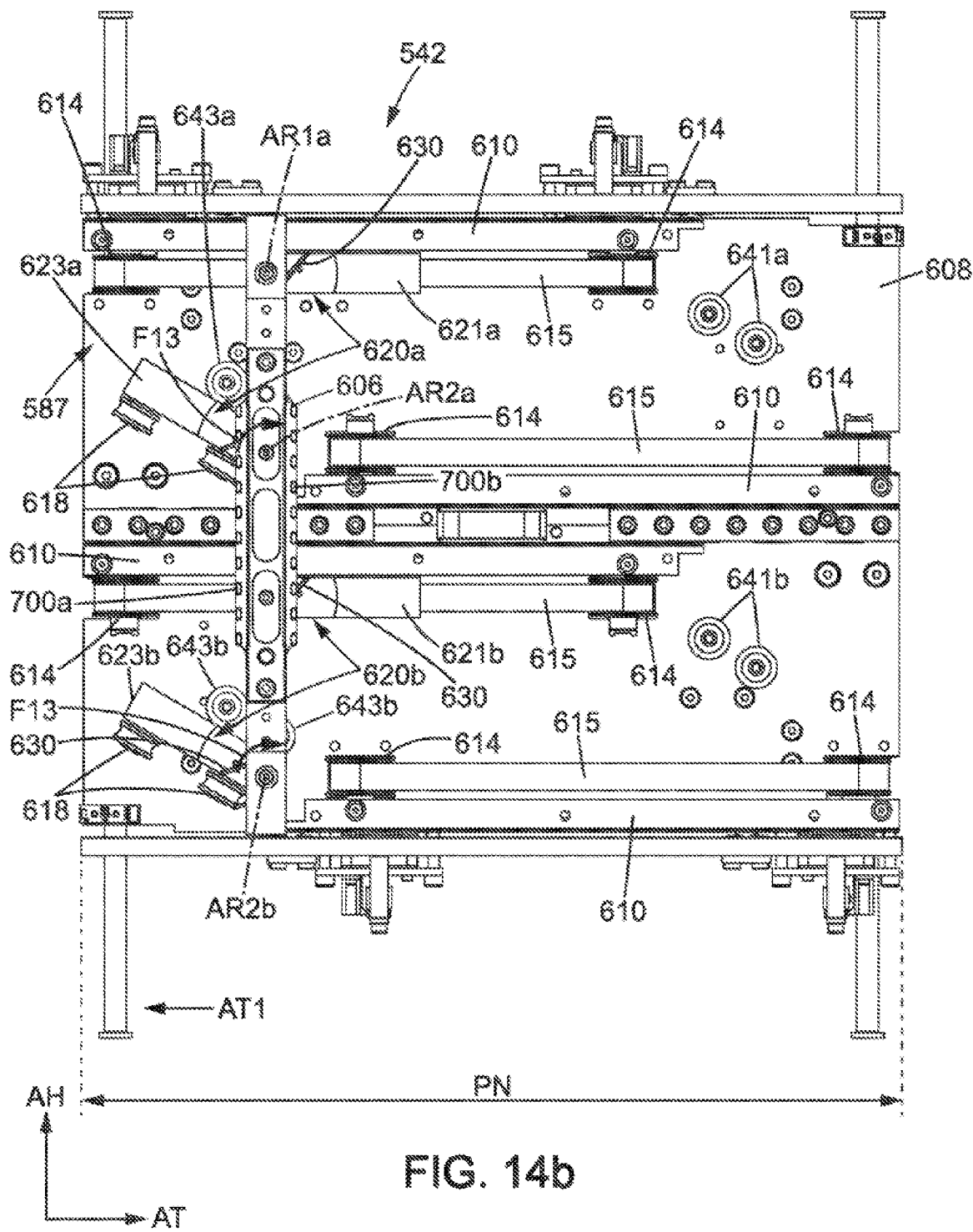
Figure 14C:
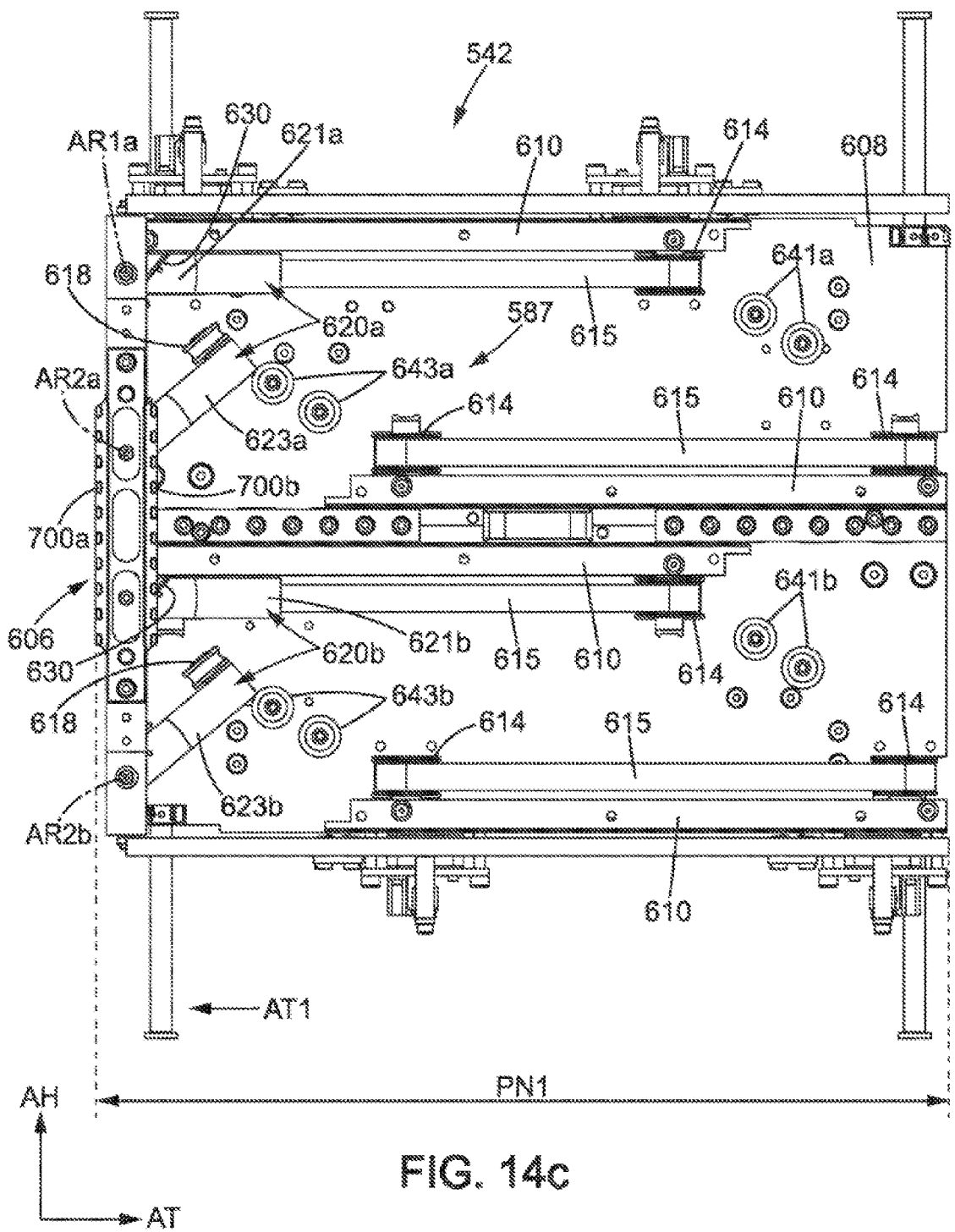
Figure 15:
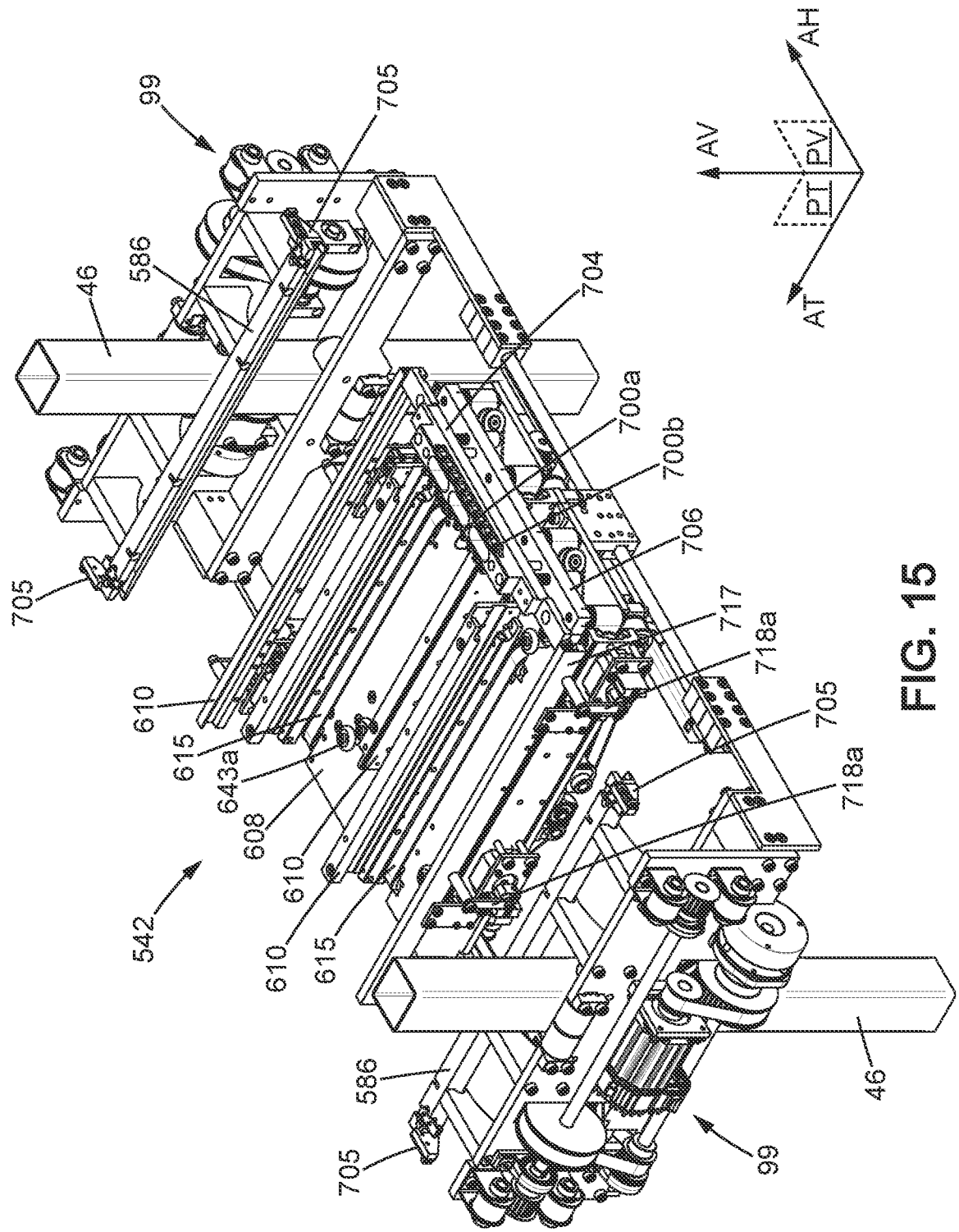
Figure 16:
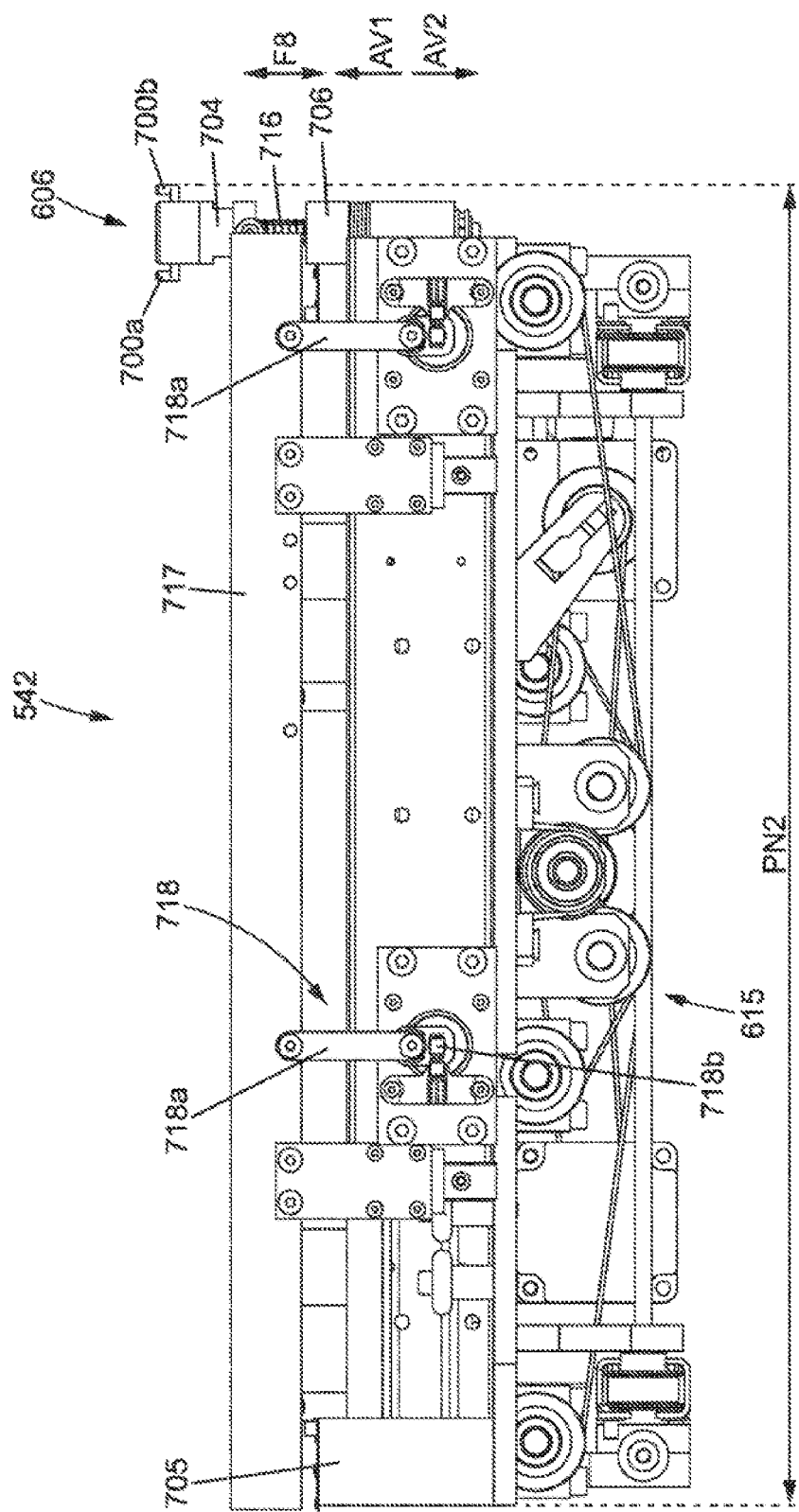
Figure 17:
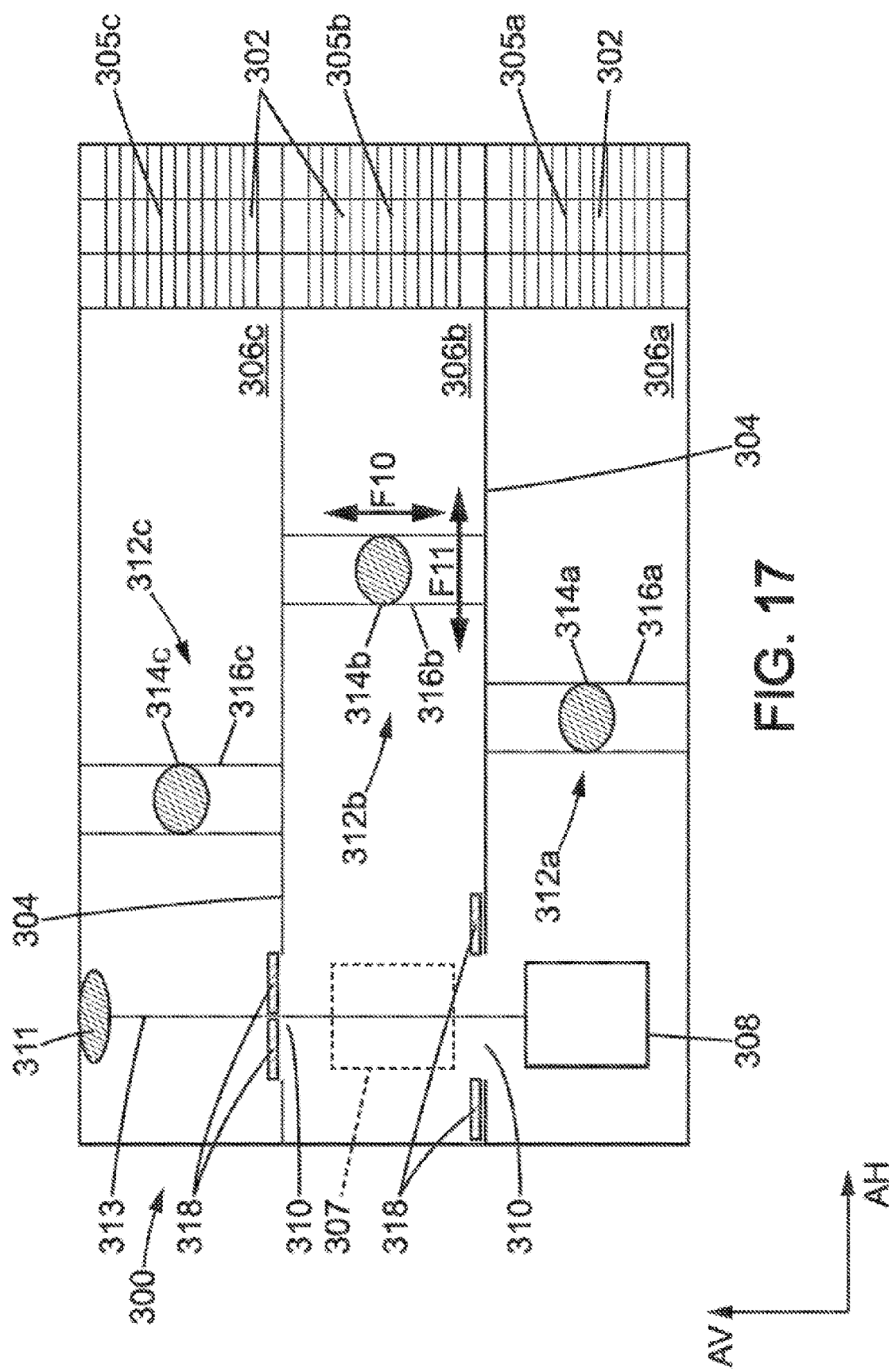

FIG. 13 is a schematic view from above of the transport shuttle of FIG. 10, with the base shown in a second position to accommodate a second removable support size larger than the first, and the extension system shown in a second extended position to be able to hook a removable support located opposite those hooked by the gripper when the latter is in the first extended position; and FIGS. 14a, 14b, 14c are partial schematic views of a transport shuttle having an extension system according to a second embodiment, represented with the receiving base having a first span, FIG. 14a showing the extension system in a neutral position, FIG. 14b showing the extension system in an intermediate position, FIG. 14c showing the extension system in a extended position;

FIG. 15 is an isometric schematic view of the transport shuttle of FIGS. 14a, 14b, 14c, with the receiving base having a second span and with the extension system shown in an extended position;

FIG. 16 is a schematic elevation plan view of one embodiment of a gripper of the transport shuttle of FIGS. 14a, 14b, 14c, the gripper being shown in the protruding position; and FIG. 17 is a schematic perspective view of another embodiment of the goods storage area of the storage and distribution module, showing temperature-controlled chambers.

In the different figures, the same references designate identical or similar elements.

DETAILED DESCRIPTION

Figure 1:
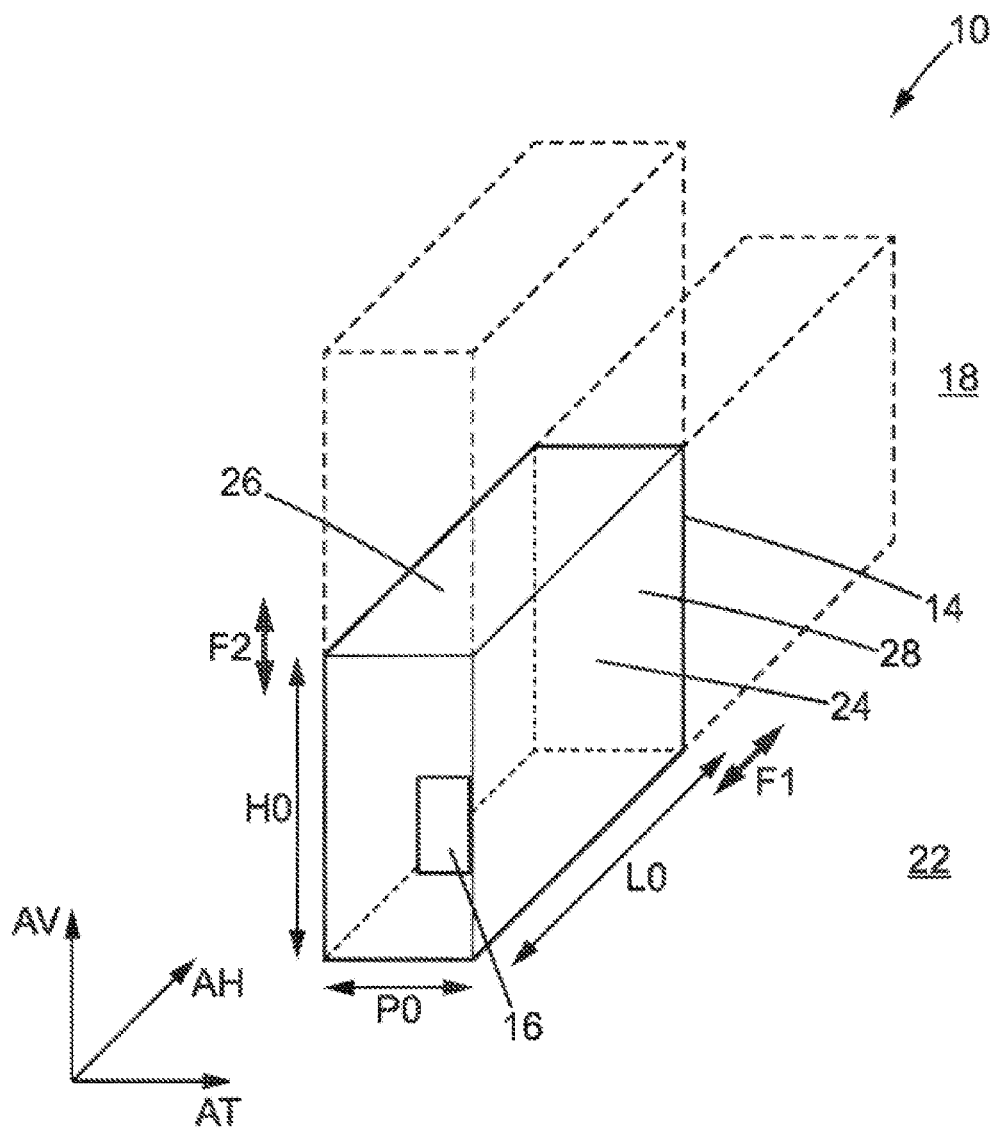
FIG. 1 is a schematic perspective view of a goods storage and distribution module according to one embodiment.

A storage and distribution module 10 for goods 12 is illustrated in FIG. 1. The module 10 is an automated system enabling the distribution and storage of goods 12 of various sizes, typically parcels. The storage and distribution module 10 for goods 12 comprises a closed enclosure 14 and an interaction window 16 allowing the passage of goods 12 (shown in FIG. 4) from outside 18 the module 10 to inside 20 the module 10 (shown in FIGS. 2 to 4). The module 10 could include several interaction windows, for example to allow simultaneous storage or access to different areas of the module 10, or even access to the same area of the module 10 but by different points (for example the case of an interaction window inside a building housing the storage and distribution module 10 for goods 12, and one interaction window inside this building). The interaction window 16 is located at a height for user interaction, typically about 1 meter from the ground 22. The interaction window 16 is illustrated in FIG. 1 as being located on a longitudinal face 24 of the enclosure 14. However, the interaction window 16 could be located on other faces of the enclosure 14 as long as it is accessible to users. It could also be located towards an edge of such a face, as illustrated in FIG. 1, or laterally in the middle of such a face.

The module 10 is ideally located in a space allowing people to stop momentarily in order to deposit and/or remove goods stored in the module 10. The module 10 may be stored inside a building, whether residential or commercial, or outdoors for example in a parking lot. The module 10 may be positioned against a wall or may be without any lateral connections. The module 10 could also be integrated into a surrounding wall of a store, such that the interaction window 16 faces the street and the enclosure 14 of the module 10 is located inside the store. The module 10 may be designed to be removable, so that it is only temporarily present in an area of pedestrian traffic, for example seasonally or when under a rental contract for the floor space.

The module 10 may have a custom shape and custom colors. In the example of FIG. 1, the module 10 is of rectangular shape, having a length L0, a height H0, and a depth P0. The module 10 thus defines a horizontal axis AH along which the length L0 is measured, a vertical axis AV along which the height H0 is measured, and a transverse axis AT along which the depth P0 is measured. The vertical AV, horizontal AH, and transverse AT axes are perpendicular to each other and form an orthogonal space. The dimensions of the module 10 may be chosen according to the area occupied by the module 10 in the space where it is placed (in other words the floor surface area and the height) and/or the type of goods 12 that it stores. According to one non-limiting example, the module has a length L0 of 3 meters, and a depth P0 of 1.45 meters.

The module 10 may be of adjustable size. Thus, according to one embodiment, the module 10 can be enlarged by adding length to the storage space as illustrated by dots and the arrow F1, or height to the space as illustrated by dotted lines and the arrow F2. The enlarging or shrinking of the module 10 makes it possible to adapt the available storage space to customer needs. To allow the height of the module 10 to be customized for example, an upper wall 26 of the module 10 could be removable, to allow vertically inserting side panels between the original enclosure 14 and the upper wall 26. Similarly, to extend the module 10 along the horizontal axis AH, a side wall 28 of the module 10 could be detached from the enclosure 14 of the module 10 to allow insertion of a separating storage area. Other operations could be carried out to ensure the operation of the enlarged module 10 as if it had originally been of this size. According to another embodiment, two modules may be placed side by side or close to one another in order to enlarge the storage space. However, in that embodiment, the two modules would operate independently of one another.

The module 10 is capable of receiving a variety of goods 12. According to one embodiment, the goods 12 are everyday products, possibly packaged into parcels, which are intended to be temporarily stored in the module 10 before distribution to customers. The goods 12 are, for example, books, household products, photo prints, perishable goods (fresh produce, frozen products for example). The module 10 may be programmed to receive only packaged products, for example packaged in boxes or plastic packaging, or only bulk products, or both. The module 10 may also be organized to receive goods 12 of one or more standard sizes, or of any size, as long as these sizes are compatible with the storage system described below. The module 10 could receive a combination of products of a predefined size and products of any size. The interior 20 of the module 10 may be temperature-controlled, in other words at a constant or almost constant temperature due to a heating or cooling system having a feedback loop based on a fixed and predetermined temperature.

In another embodiment, the goods 12 stored and distributed by the module 10 are not arranged in the module 10 temporarily for distribution to customers, but are intended to be presented to them temporarily while remaining more or less permanently in the module 10. In this case, the goods could be for example machines such as a printer or computer, intended to be used by a customer who comes to the module 10 to accomplish a specific task (e.g. photo printing) via the interaction window 16.

In addition, the concept of "customers" is not necessarily associated with a commercial relationship with the module 10. The module 10 could for example be kept within a company and be intended for the employees of the company.

Figure 2:
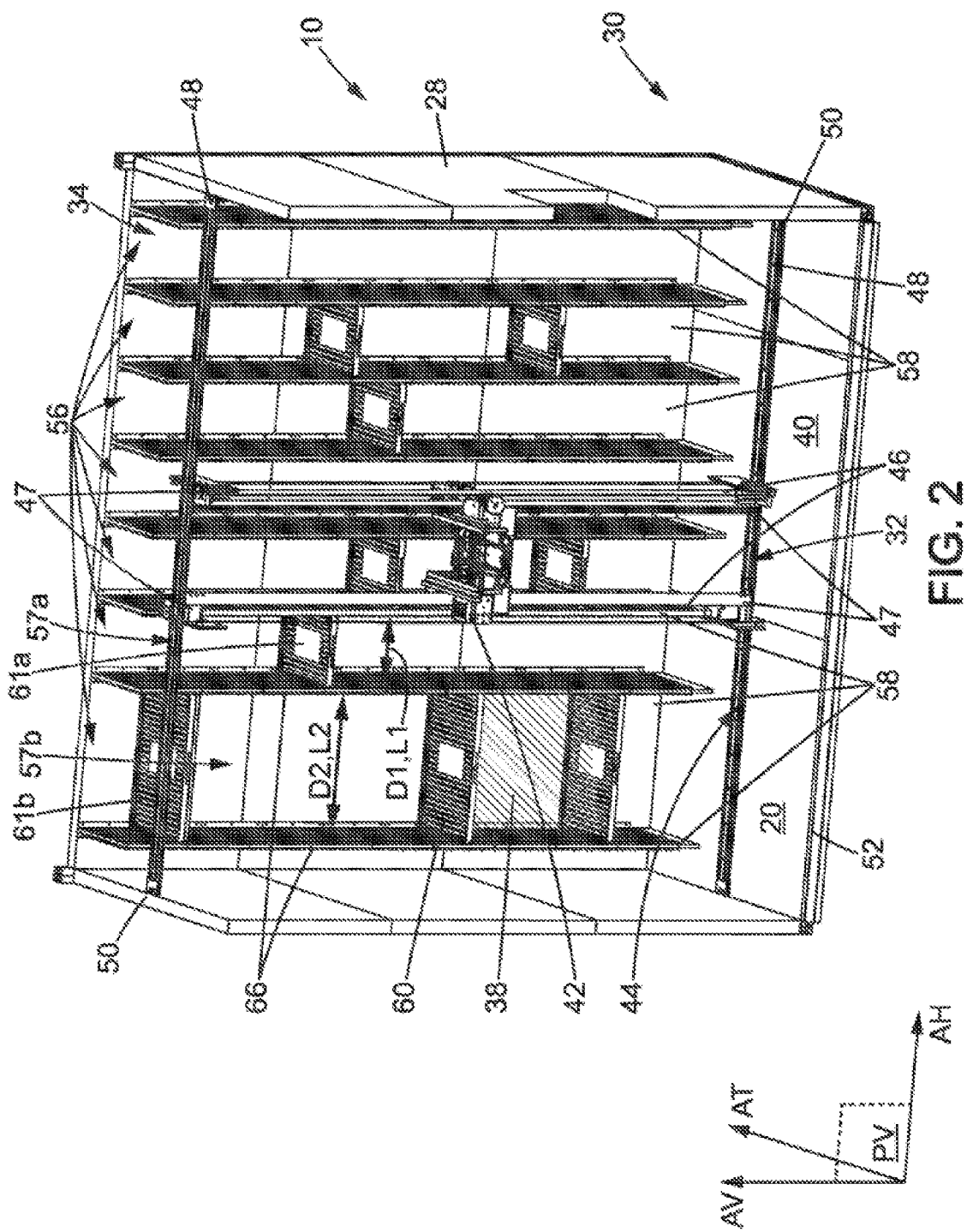
FIG. 2 is a schematic perspective view of part of an interior of the storage and distribution module of FIG. 1, revealing a first goods storage area and a transport system, according to one embodiment.
Figure 3:
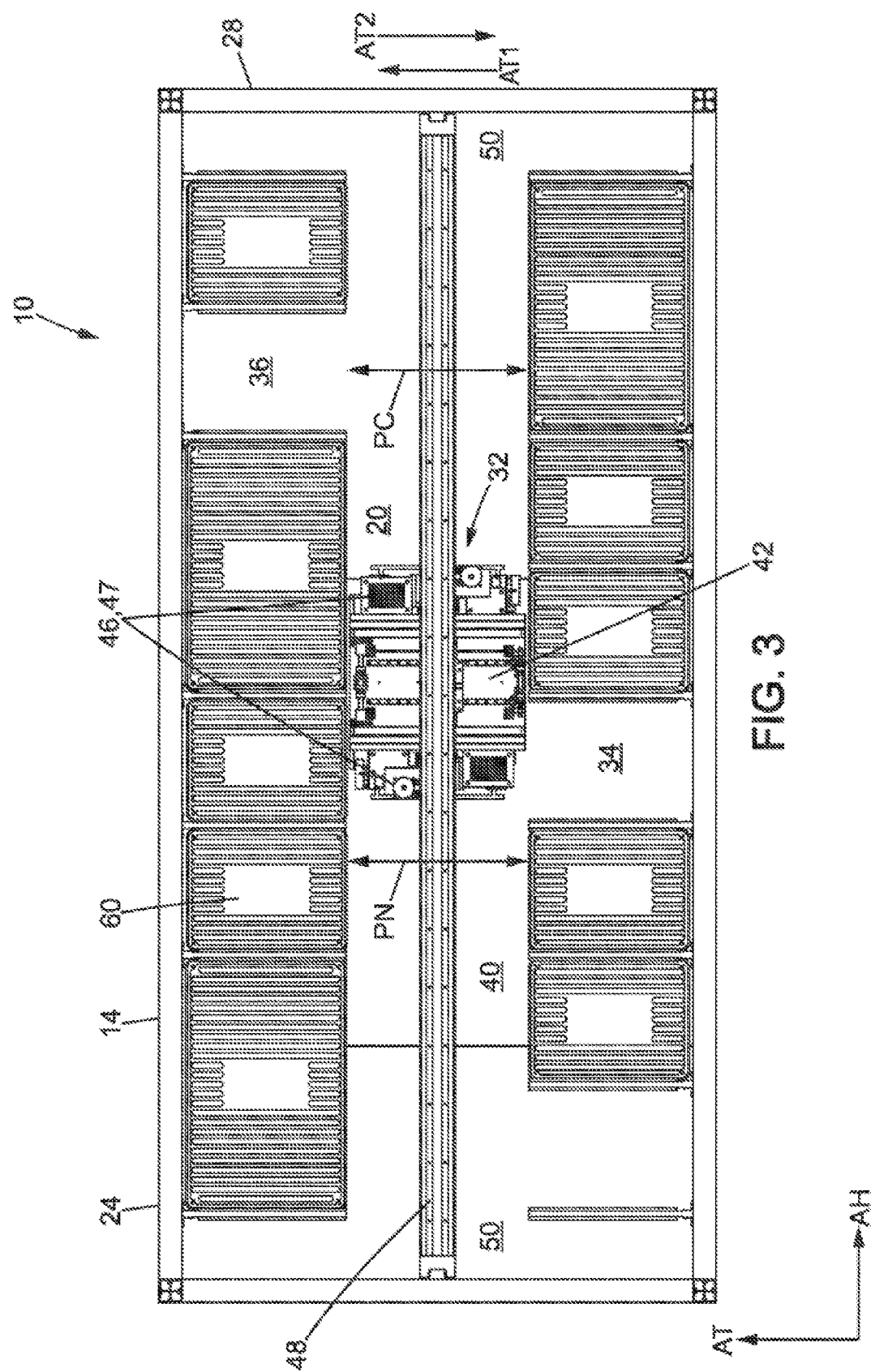
FIG. 3 is a schematic top view of the interior of the storage and distribution module of FIG. 1, showing a storage and distribution system including the transport system and the first storage area of FIG. 2, and a second storage area facing it.
Figure 4:
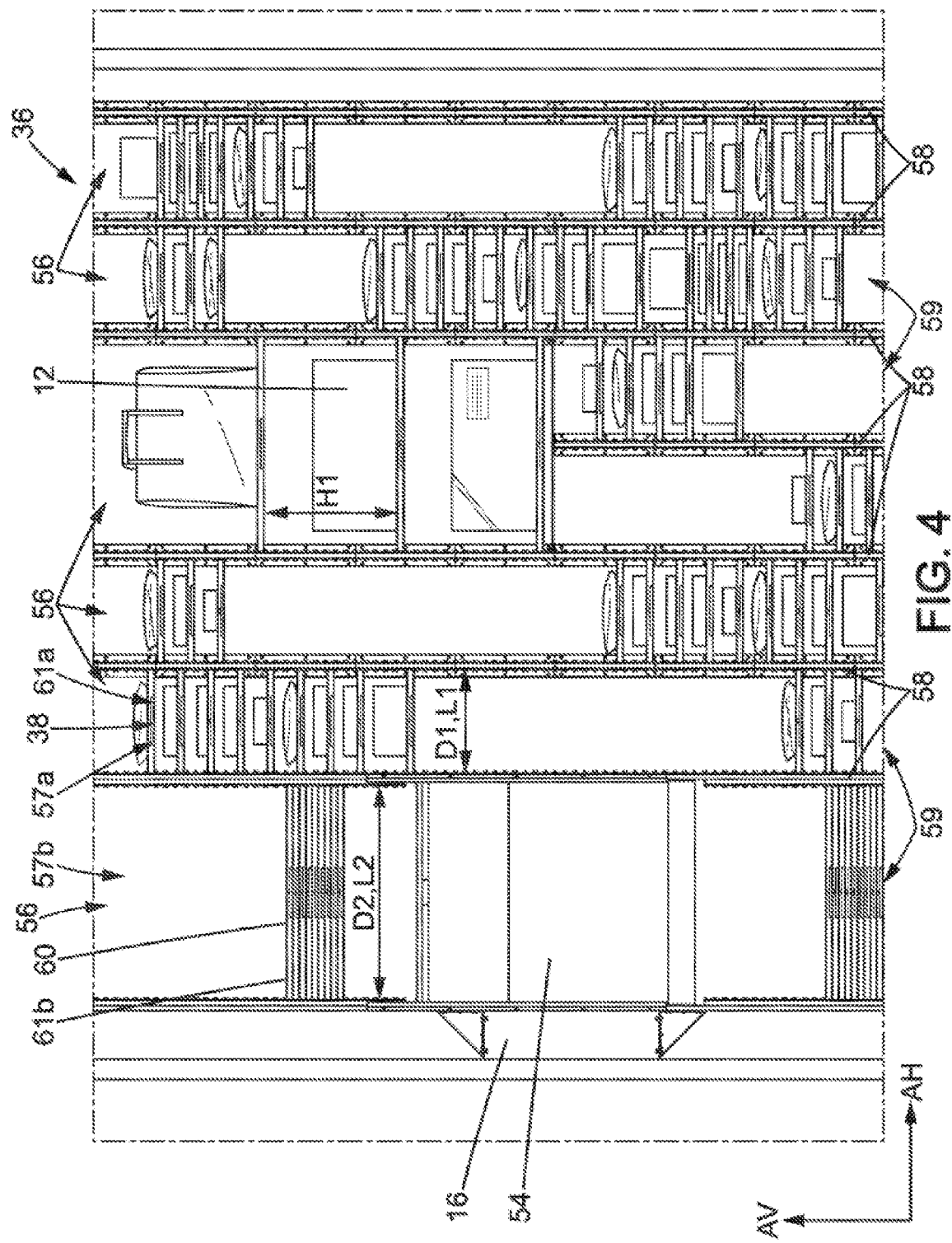
FIG. 4 is a schematic elevation plan view of the second goods storage area of the storage and distribution module, according to one embodiment.

With reference to FIGS. 2 to 4, the interior 20 of the module 10 contains an automated goods storage and distribution system 30, comprising a goods 12 transport system 32 (shown by itself in FIG. 5) and a first storage area 34 for goods 12 (shown in FIGS. 2 and 3) and a second storage area 36 (shown in FIGS. 3 and 4) each generally extending in a vertical plane PV. The vertical plane PV is defined by the vertical AV and horizontal AH axes. Each of the first and second storage areas 34, 36 comprises a plurality of storage spaces 38. An exemplary storage space 38 is indicated with hatching in FIG. 2. The goods 12 transport system 32 ensures the transfer of goods 12 to and from the storage spaces 38 of the first and second storage areas 34, 36. The transport system 32 will be described further below in relation to FIG. 5.

As illustrated in FIG. 3, in this embodiment, the first storage area 34 faces the second storage area 36. In other embodiments, it is possible for the module 10 to contain only one among the first and second storage areas 34, 36. It is also possible for the first and second storage areas 34, 36 not to face each other but to be at an angle to each other, for example perpendicular to each other.

The first and second storage areas 34, 36 are separated transversely by a movement passage 40 used by the goods 12 transport system 32. The movement passage 40 is a three-dimensional passage, transversely defined in the above example by the space extending for the height and length between the first and second storage areas 34, 36. The movement passage 40 is only delimited transversely by the first and second storage areas 34, 36. In the case where the module 10 has only one storage area, the movement passage 40 could be transversely defined by the space extending for the height and length between this storage area and a wall of the enclosure 14. According to one non-limiting example, the first storage area 34 has a depth of 42 cm (16.5 inches), the second storage area 36 has a depth of 42 cm (16.5 inches), and the movement passage has a depth of 47 centimeters (18.5 inches).

Each of the two storage areas 34, 36 contains a plurality of dynamic shelving areas 56. The storage areas 34, 36 may contain the same number or a different number of dynamic shelving areas 56 relative to one another. In the example of FIG. 2, the first storage area 34 contains seven dynamic shelving areas 56, and in the example of FIG. 4, the second storage area 36 contains ten dynamic shelving areas. Each dynamic shelving area 56 extends vertically, for the entire height of the enclosure 14 (as illustrated in FIG. 2), or for part of the height of the enclosure 14 (case of nested shelving areas 59 illustrated in FIG. 4).

Each dynamic shelving area 56 comprises a vertical stack of storage spaces 38 having a height H1 that is adjustable according to the size of the good 12 to be stored therein. The storage spaces 38 inside a dynamic shelving area 56 are formed laterally by fixed vertical walls 58 and vertically by removable supports 60. The vertical walls 58 may or may not be perforated. The space between two adjacent removable supports 60 along the vertical axis AV determines the height H1 of the storage space 38 defined between these two removable supports 60. Thus, the shelving area is dynamic because the removable supports 60 have a plurality of possible vertical positions and this height is temporarily adjustable according to the good 12 to be stored therein. As soon as a new good 12 is to be stored in the dynamic shelving area 56, another position of the removable support 60 will be determined according to the size of the good 12 and of the goods already stored in this dynamic shelving area 56. Having different possible positions of the removable supports 60, and thus obtaining different heights of the storage spaces 38, makes it possible to adjust the volume of the storage space 38 to the size of the good 12, and consequently to reduce the unoccupied space in the storage and distribution module 10. The adjustment of the vertical positions of the removable supports 60 will be described below.

In the example shown in FIG. 4, the vertical walls 58 are either at a first width D1, or at a second width D2 of greater value, in order to form dynamic shelving areas 56 of different widths and therefore storage spaces 38 of different sizes, for the purpose of accommodating goods 12 of different sizes. Having different storage sizes (not only in height but also in width), the unoccupied space in the module 10 is further optimized. When the storage spaces 38 have two or more sizes, removable supports 60 of two or more sizes are provided. Thus, a first plurality 61a of removable supports 60 cooperates with a first plurality 57a of dynamic shelving areas 56 having the first width D1, and a second plurality 61b of removable supports 60 (larger than the first plurality 61a) cooperates with a second plurality 57b of dynamic shelving areas 56 having the second width D1. However, it is possible that all the vertical walls 58 have the same width. It is also possible that the vertical walls 58 have three or more widths which differ from each other.

One of the two storage areas 34, 36 (in the example illustrated, the second storage area 36) contains a service hatch 54 which is in communication with the interaction window 16 in order to receive goods 12 and deliver them to customers. The transport system 32 ensures the transport of goods 12 from the service hatch 54 to the dynamic shelving areas 56 (and vice versa). According to another embodiment, there could be more than one service hatch 54 in the module 10.

Figure 5:
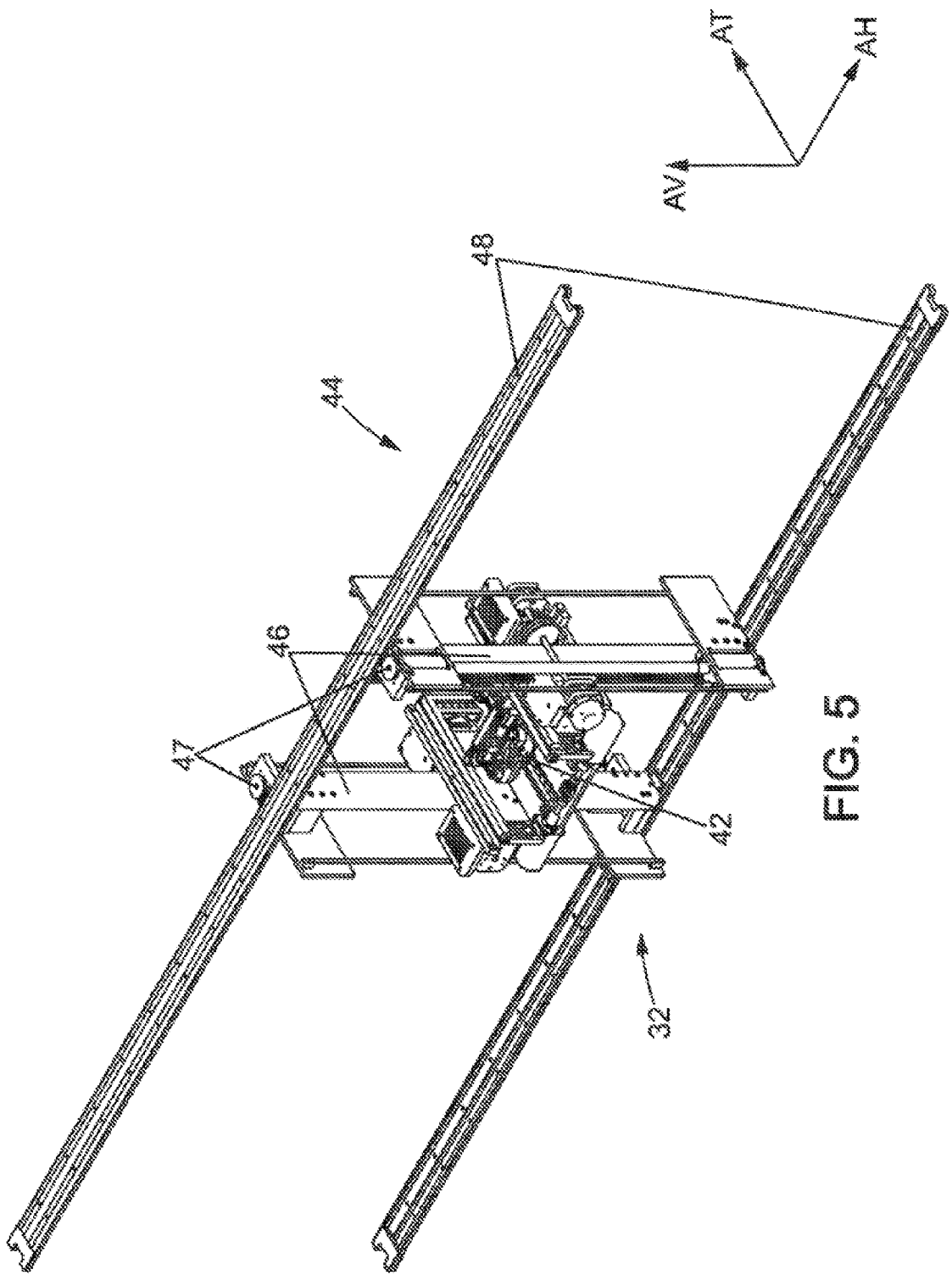
FIG. 5 is a schematic isometric view of the transport system of FIG. 2.

Referring now to FIG. 5, the transport system 32 includes a transport shuttle 42 and movement rails 44 by means of which the transport shuttle 42 moves about in the movement passage 40 within the vertical plane PV. The movement rails 44 include a pair of fixed rails 48 and at least one movable rail 46 connected at its ends 47 to the fixed rails 48 and moving bidirectionally along them. The pair of fixed rails 48 extends along an axis (horizontal AH or vertical AV), and said movable rail 46 extends along a perpendicular axis (the corresponding vertical AV or horizontal AH axis). The movement rails 44 are located in the movement passage 40.

In the example of the figures, the movement rails 44 include a pair of movable vertical rails 46 which move along the horizontal axis AH by virtue of the connection of their ends 47 to a pair of fixed horizontal rails 48. It is possible that the movement rails 44 include only one movable vertical rail connected by its ends to a pair of fixed horizontal rails 48. It is also possible that the horizontal rail(s) 48 are movable and the vertical rails 46 are fixed.

By the arrangement described below, the transport shuttle 42 is capable of moving within a vertical plane PV along the vertical AV and horizontal AH axis in order to access various storage spaces 38 located in front of it.

The two vertical rails 46 are preferably arranged, each at a vertical end 50 of the movement passage 40, so as to interfere as little as possible with access to the storage spaces 38. The ends 47 of each vertical rail 46 are respectively fixed to the upper wall 26 and a lower wall 52 (shown in FIG. 2) of the enclosure 14. They could also be directly fixed in the ground 22.

In order to move the vertical rails 46 along the horizontal rails 48, a system 99 (illustrated in FIG. 15 in relation to the shuttle 542) of toothed pulleys and belts is put in place. Motors ensure the synchronous rotation of pulleys associated with the vertical rails 46 relative to each other as the transport shuttle 42 moves along the horizontal axis AH. Other embodiments are possible.

As will be described below, according to one embodiment, the vertical rails 46 may also move relative to each other along the horizontal axis AH in order to adapt the transport shuttle 42 to different sizes of removable support 60. The movement of the transport shuttle 42 along the vertical rails 46 may occur when the vertical rails 46 are fixed, or simultaneously during their movement on the horizontal rails 48. As the module 10 is an automated system, a control unit UC ensures coordination of the movements of the transport shuttle 42 and of the vertical rails 46 in order to transport the good 12 from the interaction window 16 to and from the storage spaces 38, by means of the movement of the transport shuttle 42 and the vertical rails 46. The transport shuttle 42 may also include brakes in order to slow it down when it reaches the end of travel of the movable rail on which it is moved about.

Figure 6:
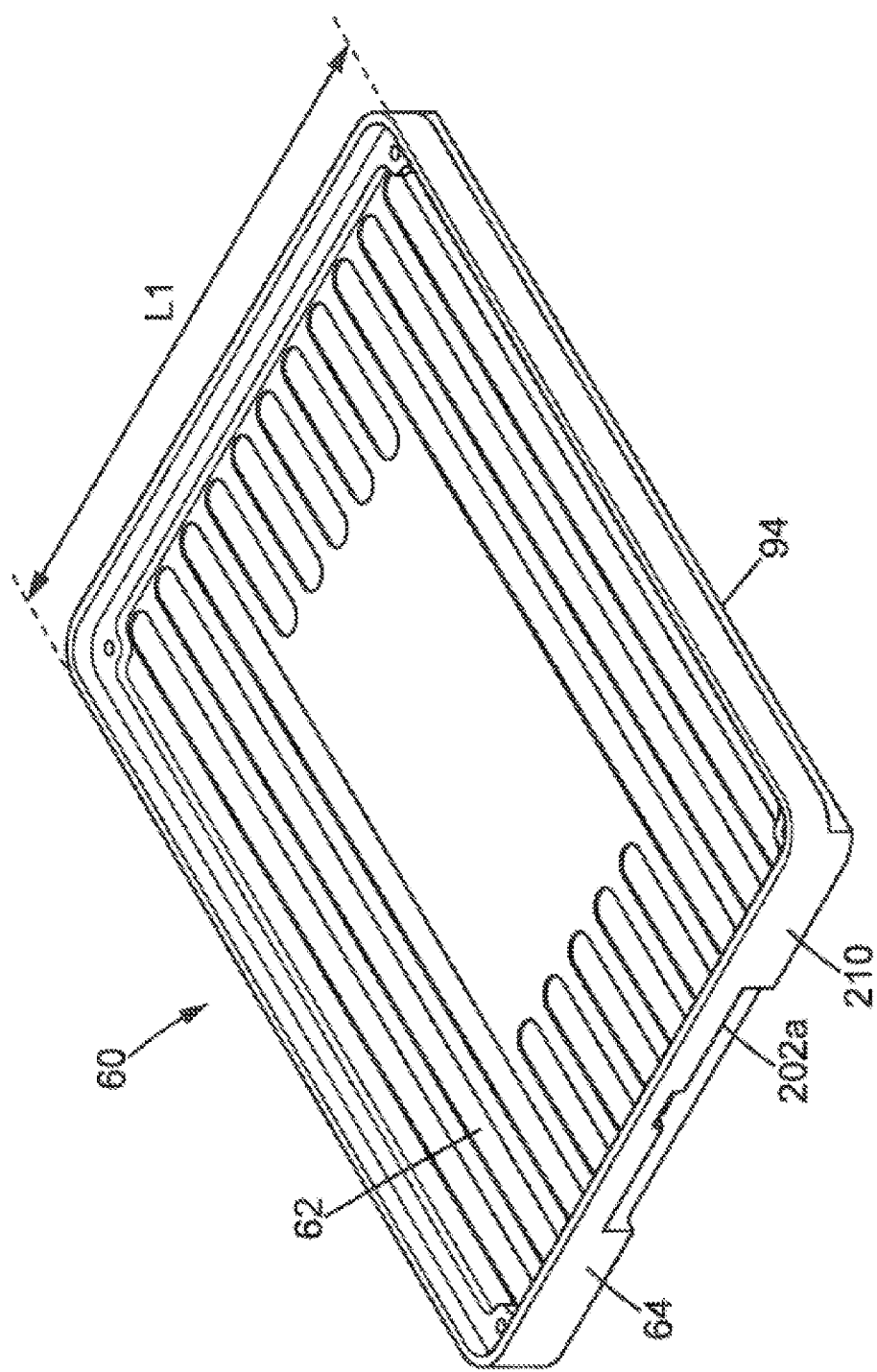
FIG. 6 is a schematic isometric view from above of a removable support for supporting goods and forming a boundary of a storage space of any of the storage areas of FIGS. 2 and 4, according to one embodiment.

Referring to FIG. 6, the removable supports 60 make it possible to support the stored goods while forming storage spaces 38. The removable supports 60 may be plates, bins, or trays. The removable supports 60 have at least one generally flat surface 62 on which the good 12 rests and may comprise one or more lips 64. The generally flat surface 62 is typically rectangular (as shown in the figures) or square, but it is conceivable for it to have other shapes. It may have a certain roughness, may or may not have reliefs, in order to reduce or even prevent the sliding of the good 12 during transport. The lips 64 can make it possible to retain the good 12 on the removable support 60 while the good 12 is being carried on the transport shuttle 42 to the storage space 38. If the good 12 contains liquid which has inadvertently escaped, the lips 64 thus can at least partially contain this leak of liquid. The lips 64 are preferably low in height in order to allow placement and removal of the good 12 on the removable support 60 through the interaction window 16. The lips 64 may be on some or all of the periphery of the generally flat surface 62. The removable supports 60 may be solid or perforated. The removable supports 60 are for example made of plastic having a rigidity compatible with the weight of the goods 12 stored thereon. The removable supports 60 could also have a certain flexibility depending on the weight of the good 12 stored thereon.

Figure 7:
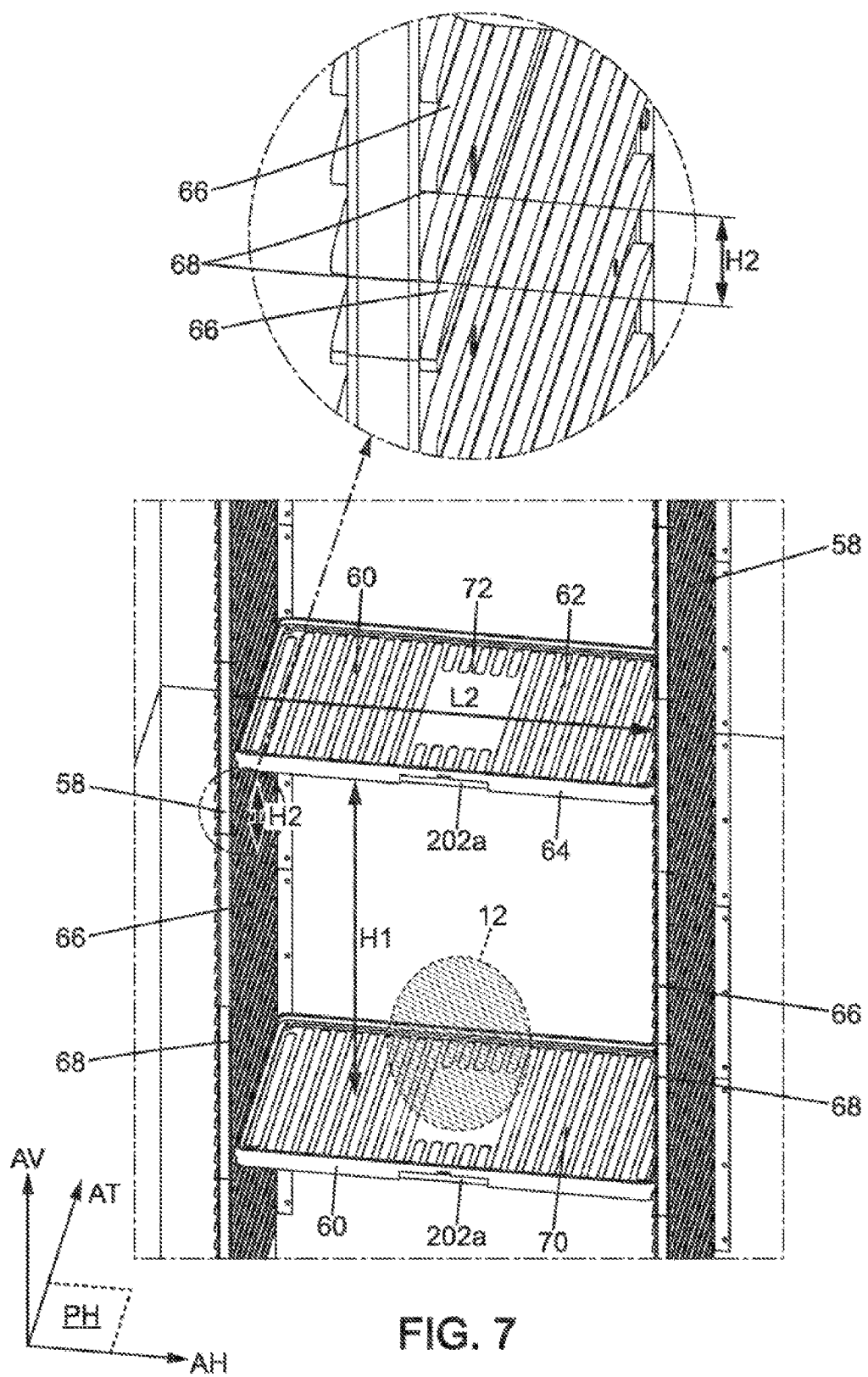
FIG. 7 is a close-up of a portion of the first storage area of FIG. 2, showing a storage space formed between two removable supports.

Referring now to FIG. 7, the principle of dynamic shelving areas 56 will now be described in more detail. The removable supports 60 cooperate with any of a plurality of pairs of supporting elements 66 in order to adjust the height H1 of the storage spaces 38. The pairs of supporting elements 66 are fixed to the vertical walls 58 vertically with respect to one another. The supporting elements 66 of a same pair face each other, being arranged on adjacent vertical walls 58. The ends 68 of the supporting elements 66 of a same pair are aligned horizontally. Thus, when a removable support 60 is connected to a pair of supporting elements 66 it forms a lower boundary 70 of a storage space 38. In the example illustrated in the figures, the pairs of supporting elements 66 are comprised in a horizontal plane PH, defined by the horizontal axis AH and the transverse axis AT. According to another embodiment, the pairs of supporting elements 66 are at an angle to the horizontal plane PH. For example, the pairs of supporting elements 66 could be inclined slightly downwards.

The pairs of supporting elements 66 could have several forms. According to the embodiment of the figures, the pairs of supporting elements 66 are slides. Opposite edges 94 of the removable support 60 which contact the slides have a shape complementary to the slides. According to the example of the figures, the opposite edges 94 form a notch in the lower surface of the removable support 60 within which the supporting elements 66 are housed. It is possible for this notch to be omitted.

According to another embodiment, each of the pairs of supporting elements 66 is not a slide but includes at least two hooks, and the edges 94 of the removable supports 60 have complementary points for receiving the hooks. According to one embodiment, the pairs of supporting elements 66 are identical to one another within the storage areas 34, 36. According to another embodiment, the storage and distribution system 30 includes different removable supports 60 which are compatible with different supporting elements 60, for example slides compatible with removable supports in the form of plates, and hooks compatible with removable supports in the form of bins.

The number n1 of pairs of supporting elements 66 is greater than or equal to the number n2 of removable supports 60, so that the removable supports 60 can be connected to diverse pairs of supporting elements 66 depending on the size of the good 12 to be stored. Vertically, the pairs of supporting elements 66 are at a height H2 from one another. In the embodiment illustrated in the figures, the height H2 is identical between the pairs of supporting elements 66. However, it could be that the pairs of supporting elements 66 are at different heights relative to one another.

As will be detailed below, the removable support 60 is inserted into a given pair of supporting elements 66, with the good 12 arranged on the removable support 60, so that when the removable support 60 is inserted into the pair of supporting elements 66, it forms the lower boundary 70 of the storage space 38. As illustrated in FIG. 7, an upper boundary 72 of the storage space 38 may be formed by another of the removable supports 60, for example such as a removable support 60 containing another good 12 previously inserted into another pair of supporting elements 66 vertically above it.

Referring briefly again to FIG. 4, when the storage spaces 38 have several sizes, the pairs of supporting elements 66 internal to a same pair are at different distances from each other (along the horizontal axis AH). Thus, the supporting elements of a same pair of supporting elements 66 of the first plurality 57a of dynamic shelving areas 56 have the first width D1 between one another, making it possible to receive removable supports 61a of the first size (i.e. having a side of width L1, substantially the first width D1), and the supporting elements of a same pair of supporting elements 66 of the second plurality 57b of dynamic shelving areas 56 have the second width D2 between one another, making it possible to receive removable supports 61b of the second size (i.e. having a side of width L2, substantially the second width D2). The second width D2 is larger than the first width D1.

The first and second pluralities of dynamic shelving areas 57a, 57b could, as illustrated in FIG. 2, be arranged adjacent to one another, or as illustrated in FIG. 4, be nested one inside the other. Certain dynamic shelving areas 56 of smaller width would thus form a subdivision of dynamic shelving areas 56 of larger width (nested dynamic shelving area 59 shown in FIG. 4).

The vertical walls 58 could be easily movable along the horizontal axis AH so as to be able to adjust the proportion between the first and the second plurality of dynamic shelving areas 57a, 57b in an ad-hoc manner.

For optimization, the control unit UC automatically controls the selection of the supporting elements 66 which will receive a removable support 60 containing such or such goods 12, according to the dimensions of the good 12 to be stored therein and according to the goods already stored. An algorithm programmed in the control unit UC determines, for each new good 12 to be stored, a storage space 38 in the storage area 34, 36 which will maximize the remaining storage space once this good 12 is stored. If the good has a width less than D1, it will, for example, preferably be stored in a dynamic shelving area 57a. If the good has a width greater than D1 and less than D2, it will preferably be stored, for example, in a dynamic shelving area 57b. If the good 12 has a width greater than D2, and the module has no dynamic shelving area able to accommodate it, it will not be accepted by the module 10. The control unit UC can be programmed in different ways.

The service hatch 54 will now be described in more detail with reference to FIG. 8. The service hatch 54 is an element of the module 10 which provides the interface between the storage and distribution system 30 and the interaction window 16. The goods 12 are deposited in a goods receiving space 74 of the service hatch 54, through the interaction window 16, by the user of the module 10. Once the interaction window 16 is closed, the transport shuttle 42 comes to one side 75 of the goods receiving space 74 to seek the removable support 60 containing the good 12 thus deposited in the goods receiving space 74, and brings it to the predetermined location by the movement of the transport shuttle 42. The transport shuttle 42 in the example of FIG. 8 comes to a side of the goods receiving space 74 perpendicular to the interaction window 16. However, it is conceivable for the transport shuttle 42 to come to a side of the goods receiving space 74 that is opposite to the interaction window 16. The service hatch 54 has an opening 76 coincident with the interaction window 16, for access to the goods receiving space 74 from outside 18 the module 10.

The service hatch 54 has a removable wall 78 allowing access to the goods receiving space 74 from inside the module 20. The removable wall 78 is arranged on slides 80, and is movable vertically upward (arrow F3) by an actuator (not illustrated) in order to allow the transport shuttle 42 to access the goods receiving space 74. Different methods for moving the removable wall 78 are conceivable. For example, the removable wall 78 could be a slatted curtain which can be rolled up on a rotating support.

The goods receiving space 74 is defined by a movable wall 82 making it possible to reduce the goods receiving space 74 to correspond to the size of the removable support 60 placed therein. Thus, when the module 10 accommodates several sizes of removable support 60 (two or more), the movable wall 82 can be moved (arrow F4) so as to flank the removable support 60.

Figure 8:
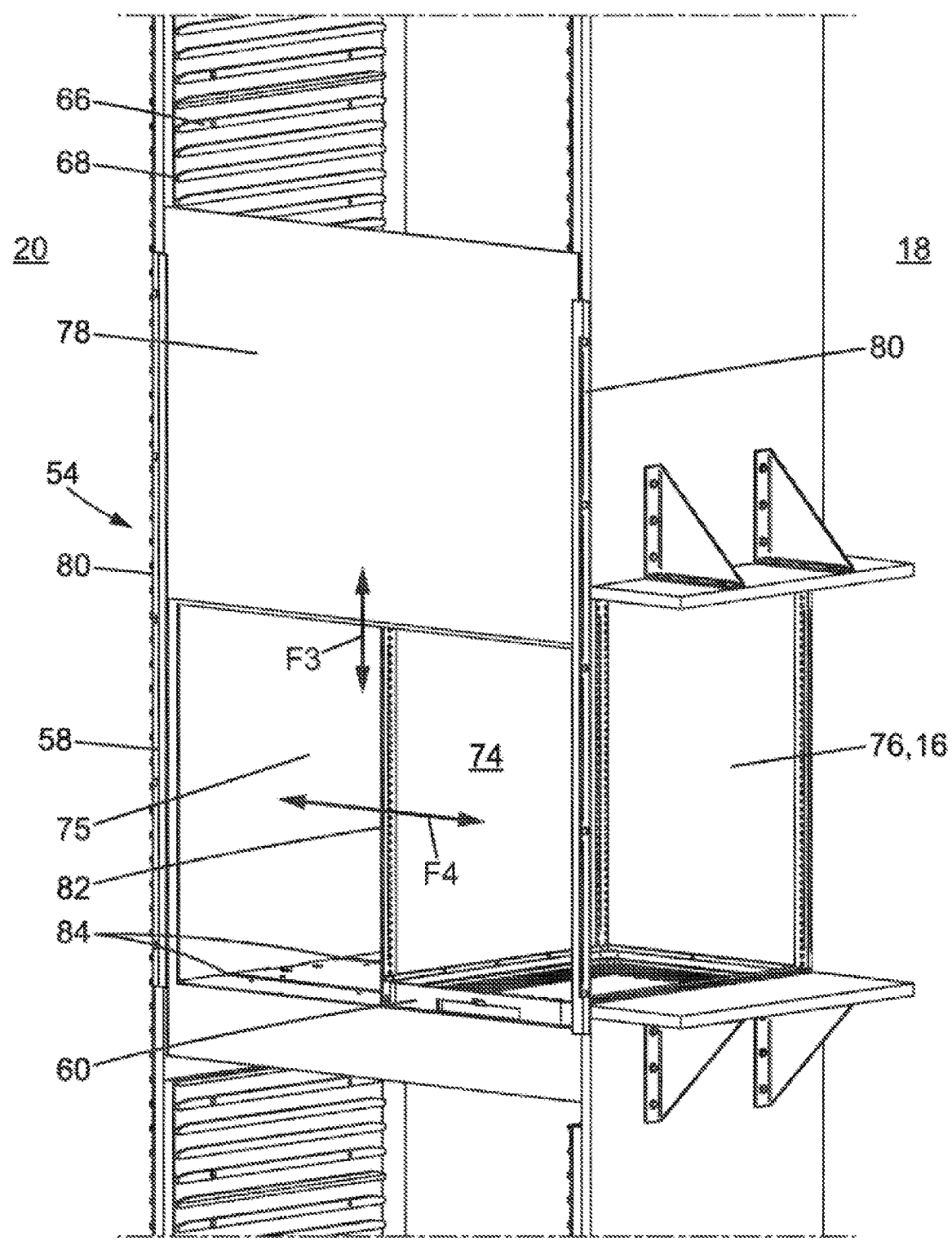
FIG. 8 is an isometric view of a service hatch of the goods storage and distribution module, according to one embodiment.

In the example of FIG. 8, the removable wall 82 is movable between two positions in order to accommodate two sizes of removable support 60. In a first position, the removable wall 82 rests against one of the vertical walls 58 opposite the interaction window 16, and the goods receiving space 74 allows receiving a removable support 60 of the second size (length L2). In a second position, the removable wall 82 is arranged between the two vertical walls 58 (as illustrated in FIG. 8), and the goods receiving space 74 allows receiving a removable support of the first size (width L1), in other words of smaller size (the widths L1 and L2 are illustrated in FIG. 4). It is conceivable that the removable wall 82 could have more than two positions in order to accommodate more than two sizes of removable supports 60. The removable wall 82 is, according to the example of FIG. 8, movable by sliding on slides 84. However, other means of implementing the movement of the removable wall 82 are possible.

The removable wall 82 makes it possible to guide the user of the module 10 when he or she deposits the good in the goods receiving space 74, by obscuring the interior 20 of the module 10 so that the user focuses only on the goods receiving space 74 so defined. It is also possible to omit the removable wall 82. For example, the removable wall could be omitted when the module 10 only accepts one size of removable support 60. The wall 82 could be fixed and the service hatch 54 would (or would not) accommodate only one size of removable supports 60. For example, the service hatch 54 could be oriented so that the interaction window 16 is itself partitionable in order to guide the user when depositing the good, when the size of the removable supports is variable.

Figure 11:
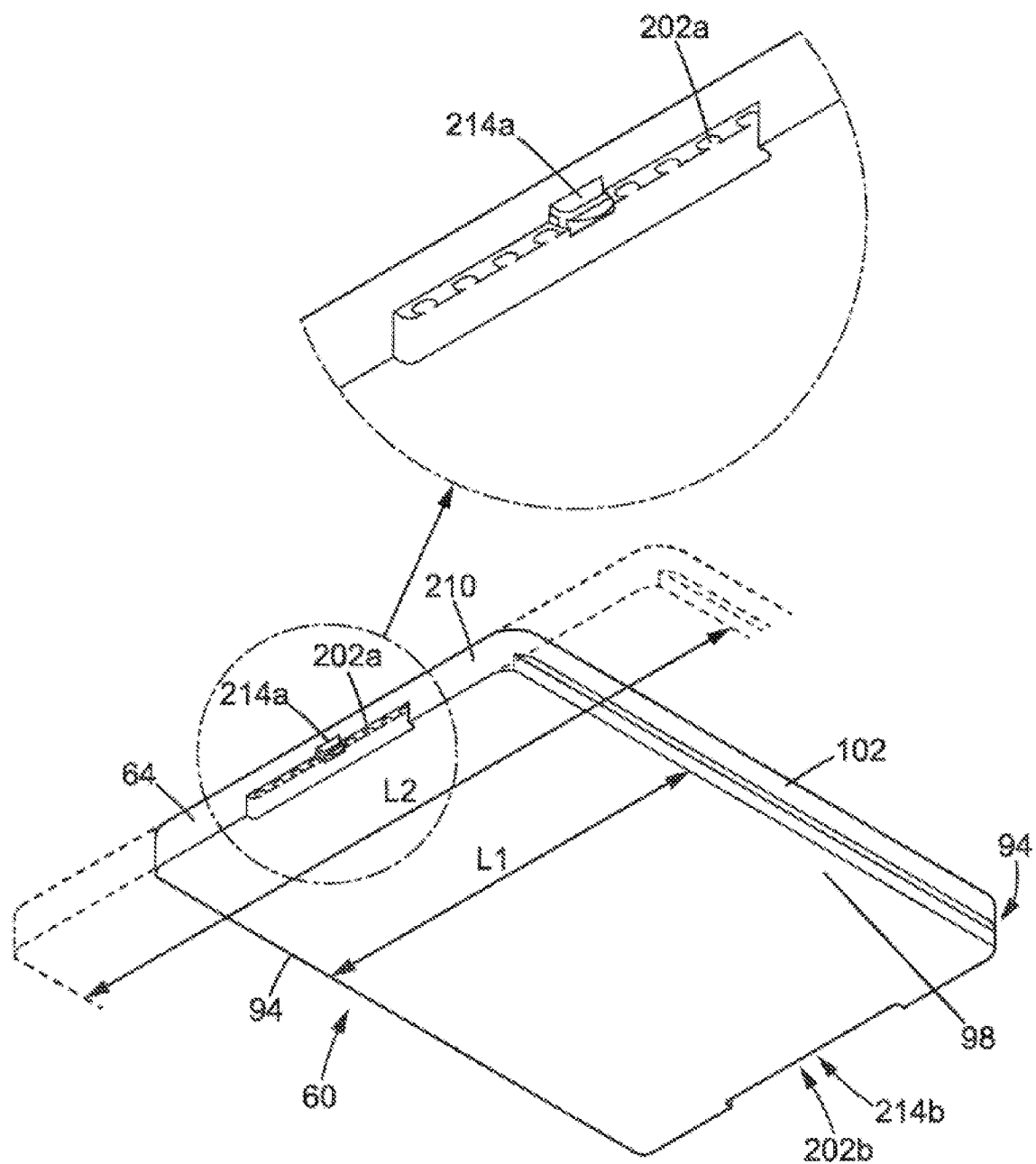
FIG. 11 is a schematic perspective view from below of the removable support of FIG. 6, with a close-up A of some vertical recesses, according to one embodiment.

A first embodiment of the transport shuttle 42 will now be described in more detail with reference to FIGS. 9 and 10. A second embodiment of the shuttle 542 will be described and shown in relation to FIGS. 14a to 15. The embodiments described are exemplary transport shuttles compatible with the first and second storage areas 34, 36. Although they are described for storage spaces 38 of different widths, it is conceivable for the transport shuttles 42, 542 to be used for storage spaces 38 of the same width. The specific portion of the transport shuttles 42, 542 which makes it possible to accommodate several sizes of removable supports 60 will be described in relation to FIGS. 11 and 12. The shuttles 42, 542 may serve only the first or the second storage area 34, 36, or both (in that case, the shuttle will be considered bidirectional). The two embodiments of the shuttle 42, 542 have several characteristics in common and differ mainly by their extension system 87, 587 which will be described in detail below.

The transport shuttle 42 includes a receiving base 86 on which the removable support 60 is received, and an extension system 87 making it possible to transfer the removable support 60 (with or without goods on it) from the receiving base 86 to a pair of corresponding supporting elements 66.

Figure 9:
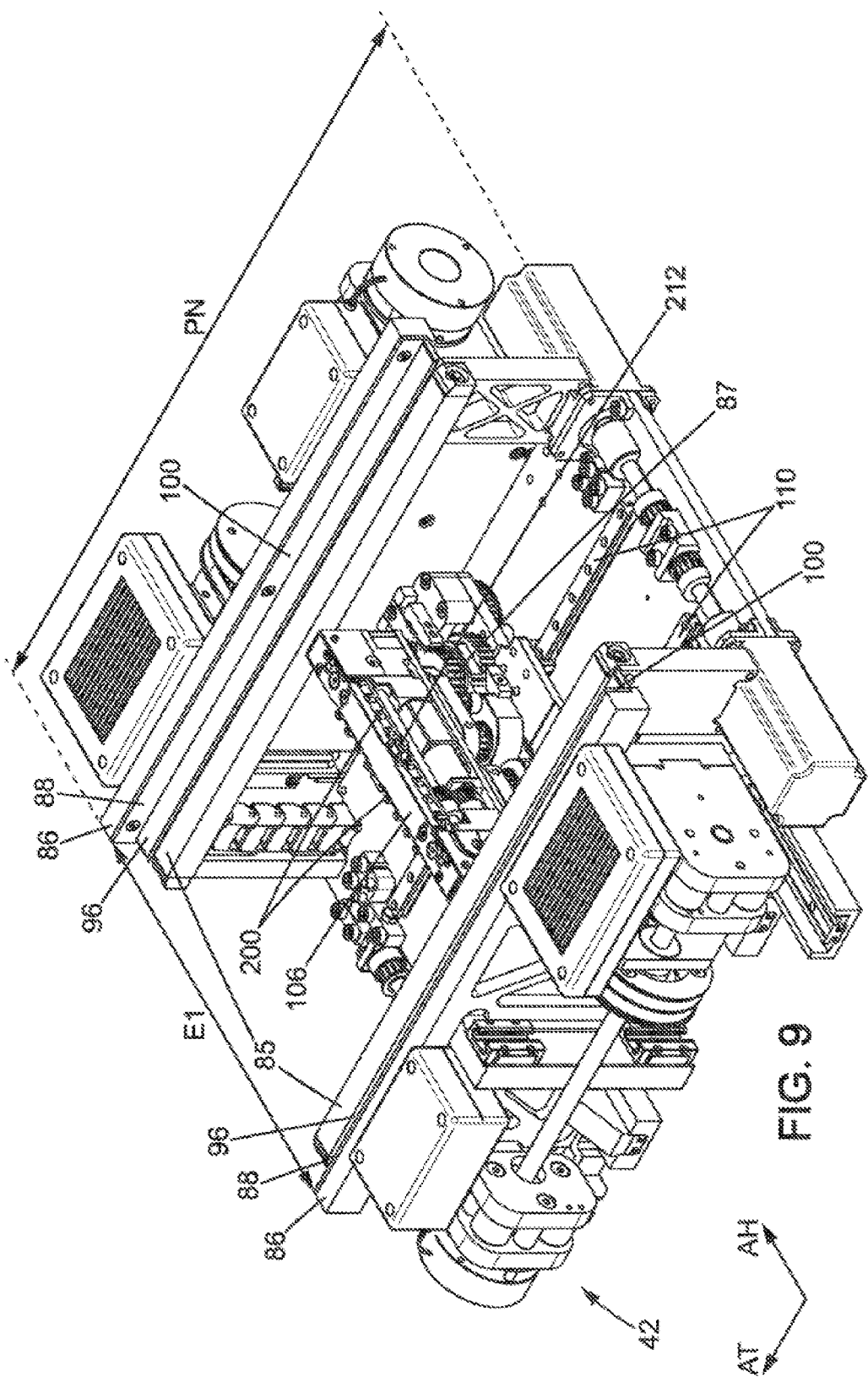
FIG. 9 is a schematic perspective view of the transport shuttle of FIGS. 2 and 3 with an extension system according to a first embodiment shown in a neutral position, and a base shown in a first position to accommodate a first size of removable support, the transport shuttle being illustrated with certain elements omitted.

In the example shown in FIG. 9, the receiving base 86 is made of two support brackets 88 each having a flat receiving surface 96 (oriented horizontally) on which rest the lower surfaces 98 of opposite edges 94 (shown in FIG. 11) of the removable support 60. The receiving base 86 includes an abutment surface 100 (oriented vertically) against which abut the side surfaces 102 (shown in FIG. 11) of the opposite edges 94.

The cooperation between the receiving and abutment surface of the receiving base 86 and the opposite edges 94 of the removable support 60 allow the removable support 60 to slide on the receiving base 86 while being laterally constrained. Although the brackets 88 are illustrated in the figures as being continuous, the brackets 88 could be discontinuous. It could also be that the brackets 88 have shapes different from those illustrated.

The transport shuttle 42 further includes a central receiving surface 85 on which the bottom surface of the removable support 60 can rest. In the embodiment of FIGS. 9 and 10, the central receiving surface 85 consists of two bars positioned one on each side of a hooking member or gripper 106 so as not to interfere with the movement of the extension system 87. One will note that the central receiving surface 85 could be omitted and the removable supports 60 be supported only by the brackets 88.

The extension system 87 allows the gripper 106 to access the removable support 60 when it is in the service hatch 54 and/or in the storage spaces 38. The extension system 87 also allows connecting the removable support 60 to the transport shuttle 42 in order to move it from and towards the service hatch 54 or the storage spaces 38.

In a neutral position of the extension system 87 (illustrated in FIG. 9), the transport shuttle 42 has a base depth PN that is less than or equal to a depth PC of the movement passage 40 (see FIG. 3), the depth being defined between extrema points of the shuttle 42 in a transverse axis AT. In this position, the gripper 106 is in the retracted position and does not protrude from the shuttle 42, which allows the shuttle 42 to move in the movement passage 40. In a first extended position of the extension system 87 (illustrated in FIG. 10), the gripper 106 is in a first protruding position relative to the rest of the shuttle 42, in other words it protrudes beyond the rest of the shuttle 42. In this position, the transport shuttle 42 thus has a first depth PN1 greater than the base depth PN and therefore than the depth PC of the movement passage 40. This makes it possible to hook a removable support 60 located in the service hatch 54 in order to transfer it for example to the shuttle 42 and from the transport shuttle 42 to a pair of supporting elements 66. The extension system 87 therefore transitions from a neutral position to the first extended position in order to move the gripper 106 between the retracted position allowing the shuttle 42 to move within the movement passage 40, and the first protruding position for accessing to the removable supports 60 when they are in their supporting elements 66 or in the service hatch 54.

According to one embodiment, the extension system 87 allows the gripper 106 to move along the transverse axis AT in two opposite directions (first extension direction AT1 illustrated in FIG. 10, second extension direction AT2 illustrated in FIG. 13) in order to change from the first protruding position to the retracted position and vice versa.

To do this, in one embodiment, the movement of the extension system 87 comprises a path traveled by the extension system 87 along a base 108 of the transport shuttle 42 on guide elements 110 (arrow F6), between the neutral position and one of the extended positions (at mid-path C1), resulting in an extension beyond the base 108 by extension of the extension system 87 (arrow F7) as half the path C1 is traveled along the base 108. In one embodiment, the guide elements 110 are rectilinear along the transverse axis AT. In one embodiment, the guide elements 110 are slides. FIG. 9 shows the extension system 87 at mid-path C1 relative to the base 108, and with the extension system 87 in the neutral position. FIG. 10 shows the extension system 87 at the end of path C1 on the base 108, and with the extension system 87 in the extended position. It is possible that the extension system 87 does not move along the base 108.

In order to optimize space, the transport shuttle 42 may be configured so that the gripper 106 (one and only one per shuttle 42) can serve the first storage area 34 but also the second storage area 36 which is opposite it (bidirectional shuttle). Thus, when the extension system 87 is at the end of its path C1 on the guide elements 110 in the first extension direction AT1, the extension system 87 is in the first extended position (for example FIG. 10), and when the extension system 87 is at the end of its path C1 on the guide elements 110 in the second extension direction AT2, the extension system 87 is in the second extended position (for example FIG. 13). The second extended position of the extension system 87 is opposite to the first extended position of the extension system 87 with respect to the neutral position of the extension system 87. As a result, the retracted position of the gripper 106 is between the first protruding position of the gripper 106 and the second protruding position of the gripper 106 along the transverse axis AT. In the second extended position of the extension system 87 (illustrated for example in FIG. 10), the gripper 106 is protruding and the transport shuttle 42 has a second depth PN2 greater than the base depth PN and therefore than the depth PC of the movement passage 40. Due to these two opposite extended positions of the extension system 87, the gripper 106 protrudes relative to the rest of the shuttle 42 and the transport shuttle 42 can access the first and second storage areas 34, 36 without rotating on itself, but by a simple extension of the gripper 106 in one or the other of the opposing directions of extension AT1 and AT2. In other words, the gripper 106 moves along the transverse axis AT while remaining parallel to itself.

Preferably, the retracted position of the gripper 106 is halfway between the first protruding position and the second protruding position. When the gripper is in the retracted position (and therefore the extension system 87 is in the neutral position), the transport shuttle 42 has the base depth PN, and in the first and second protruding positions of the gripper 106, the transport shuttle 42 has the first depth PN1 and the second depth PN2 respectively, which are greater than the base depth PN. In the example of the figures, the first depth PN1 is equal to the second depth PN2. However, it is possible for the depths of the transport shuttle 42 in the first and second extended positions to be different, while being greater than the base depth PN.

According to one particular embodiment of the shuttle 42 of FIGS. 9, 10, and 13, the extension system 87 includes two hinged arms 120a, 120b which operate while mirroring one another with respect to a transverse plane PT defined by the transverse axis AT and the vertical axis AV. The hinged arms 120a, 120b are connected to the gripper 106, and to a support 118 which slides on the slides 110. However, it is possible for the extension system 87 to have only one hinged arm.

Each of the hinged arms 120a (respectively 120b) comprises a first arm 122a (resp. 122b) connected so as to rotate relative to the support 118 about a vertical axis of rotation AR1, and a second arm 124a (resp. 124b) connected so as to rotate relative to the first arm 122a (resp. 122b) about a vertical axis of rotation AR2. The rotation of the first arm 122a (resp. 122b) in a clockwise direction (arrow 12a) causes the rotation of the second arm 124a (resp. 124b) in the opposite direction (arrow 12b). The coupled rotation between the first arm 122a (resp. 122b) and the second arm 124a (resp. 124b) is ensured by cogwheels 126a (resp. 126b) (or gear wheels) and belts (not illustrated to avoid cluttering the drawings), but could also be achieved by means of gears, motors, chains, cables, connecting rods, and/or pneumatic or hydraulic actuators. The extension system 87 includes guide elements 128a (resp. 128b) to maintain the belts in a desired direction. An amplitude of rotation of the first arm 122a (resp. 122b) may be multiplied at the second arm 124a (resp. 124b) due to varied sizes of the cogwheels 126a (resp. 126b).

In the particular embodiment of the shuttle 42 illustrated in FIGS. 9, 10, and 13, the extension system 87 is symmetrical with respect to a vertical plane PV parallel to the gripper 106, such that the first and second extended positions are mirrors of each other in relation to this plane. However, it could be that the extension system 87 is not symmetrical, such that the first extended position for example reaches removable supports 60 arranged transversely farther away from the shuttle 42 than those reached by the second extended position.

In the embodiment illustrated in FIGS. 9 and 10, a movement of the extension system 87 along the guide elements 110 causes a proportional deployment of the extension system 87. Thus, the translational movement of the support 118 along the transverse axis AT between the retracted position and the first protruding position in the first direction causes a proportionately increased translational movement of the gripper 106 in this same direction. Similarly, the translational movement of the support 118 along the transverse axis AT between the retracted position and the second protruding position in the second direction causes a proportionately increased translational movement of the gripper 106 in this same direction. However, it is possible for the extension system 87 to be designed such that when at the end of its path C1 on the slides 110 it is not yet in an extended position, and the extension of the extension system 87 is not proportionately correlated with the travel on the guide elements 110. The movement of the extension system 87 would then occur in two stages (travel for a length shorter than that of the shuttle, and then extension).

Another embodiment of the transport shuttle 542 will now be described with reference to FIGS. 14a to 15. Shuttle 542 essentially differs from shuttle 42 in its extension system.

The transport shuttle 542 includes a receiving base 586 on which the removable support 60 is received, and the extension system 587 which makes it possible to transfer the removable support 60 (with or without goods on it) from the receiving base 586 of the shuttle 542 to a corresponding pair of supporting elements 66.

In the example of FIGS. 14a to 15, the receiving base 586 is a pair of bars each having a C-shaped cross-section, the C receiving an edge 94 of a removable support. The removable support 60 could be modified to have fins at its lateral edges, such that the fins are received in the interior C-shaped portion of the receiving base 586.

Similarly to extension system 87, extension system 587 enables the gripper 606 to access the removable support 60 when it is located in the service hatch 54 and/or in the storage spaces 38. Extension system 587 also allows connecting the removable support 60 to the transport shuttle 542 in order to move it about on the shuttle 542 and to and from the service hatch 54 or the storage spaces 38.

In order to optimize space, transport shuttle 542 is configured so that the gripper 606 (only one per shuttle 542) can serve the first storage area 34 but also the second storage area 36 which is opposite it (bidirectional shuttle). Thus, according to one embodiment, the extension system 587 allows the gripper 606 to move along the transverse axis AT in the two opposite directions of extension AT1 and AT2 in order to transition from the first protruding position to the second protruding position by passing through the retracted position and vice versa. Similarly to extension system 87 of shuttle 42, when extension system 587 is at the end of its path C2 in the first extension direction AT1, extension system 587 is in the first extended position (illustrated in FIG. 14c), and when extension system 587 is at the end of its path C2 in the second extension direction AT2, extension system 587 is in the second extended position (mirror image of FIG. 14c). The second extended position of extension system 587 is opposite to the first extended position of extension system 587 relative to the neutral position of extension system 587. Therefore, the retracted position of the gripper 606 is between the first protruding position of the gripper 606 and the second protruding position of the gripper 606 along the transverse axis AT. In the second extended position of extension system 587, the gripper 606 is protruding and the transport shuttle 542 has a second depth PN2 greater than the base depth PN and therefore than the depth PC of the movement passage 40. With these two opposite extended positions of the extension system 587, the gripper 606 is protruding relative to the rest of shuttle 542 and the transport shuttle 542 can access the first and second storage areas 34, 36 without rotating on itself, but by simple extension of the gripper 606 in one or the other of the opposing directions of extension AT1 and AT2, while remaining parallel to itself.

Preferably, the retracted position of the gripper 606 is halfway between the first protruding position and the second protruding position. When the gripper 606 is in the retracted position (and therefore the extension system 587 in the neutral position), the transport shuttle 542 has the base depth PN, and in the first and second protruding positions of the gripper 606, the transport shuttle 542 respectively has the first depth PN1 and the second depth PN2, both greater than the base depth PN. In the example of the figures, the first depth PN1 is equal to the second depth PN2. However, it is possible for the depths of the transport shuttle 542 to be different in the first and second extended positions, while being greater than the base depth PN.

The movement of the extension system 587 comprises a path traveled by the extension system 587 along a base 608 of the transport shuttle 542 on guide elements 610 arranged along the transverse axis AT, resulting in an extension of the gripper 606 beyond the base 608. The description of the extension system 587 will be made with reference to FIGS. 14a to 15, where FIG. 14a shows the gripper 606 at mid-path C2' (C2' being half of path C2) relative to the base 608, the extension system 587 being in the neutral position. FIG. 14b shows the extension system 587 in an intermediate position between the neutral position and the first extended position, and FIG. 14c shows the extension system 587 at the end of its path C2 on the base 608, the extension system 587 being in the second extended position.

According to one embodiment, and as illustrated in FIGS. 14a to 15, the extension system 587 comprises two pairs 620a, 620b of retractable arms. However, it is possible that the extension system 587 has only one pair or more than two pairs of retractable arms. In the embodiment illustrated, each of the pairs 620a, 620b of retractable arms is arranged in general on a half of the gripper 606 which is specific to it along the horizontal axis AH. Such a distribution of the retractable arms relative to the gripper 606 can allow better balancing of the forces that the gripper 606 undergoes when it is connected to the removable support 60 for example.

More particularly, each of the pairs 620a (respectively 620b) of retractable arms comprises a first arm 621a (resp. 621b) connected to the gripper 606 so as to rotate about a vertical axis of rotation AR1a (resp. AR1b), and a second arm 623a (resp. 623b) connected to the gripper 606 so as to rotate about a vertical axis of rotation AR2a (resp. AR2b). Each of the arms 621a, 623a, and 621b, 623b respectively of the pairs 620a, 620b has a rectilinear travel position along the transverse axis AT and an associated retracted position. In the retracted position, the arm is at a non-zero angle with the transverse axis AT and positioned such that it does not extend beyond the gripper 606 in the extension direction along the transverse axis AT. FIG. 14c shows the second arm 623a of pair 620a and the second arm 623b of pair 620b in the retracted position.

Each of the retractable arms 621a, 623a, 621b, 623b of the pairs 620a, 620b is rotatably connected to the gripper 606 by one of their ends, the other end being free. Internal to each pair of retractable arms 620a (respectively 620b), the arms 621a, 623a (resp. 621b, 623b) have their own movement. For example, when the gripper 606 is in one of the protruding positions, one arm of the pair has the retracted position and the other arm has the rectilinear travel position (as illustrated in FIG. 14c, the first arms 621a and 621b being in the rectilinear position and the second arms 623a and 623b being in the retracted position). When the gripper 606 is in the retracted position, the two arms of the pair 620a, 620b both have the rectilinear travel position (as illustrated in FIG. 14a). In this position, the arms 621a, 623a and 621b, 623b internal to each pair 620a, 620b are arranged such that along the transverse axis AT the gripper 606 is located between each arm.

The movement of one of the arms of each pair is coupled to the movement of the other of the arms of the pair of retractable arms, in order to ensure the retraction of one when the other is at the end of its path C2. The retraction allows the arm which is in front of the gripper 606 in the extension direction to be located behind the gripper 606 when it is at the end of its path C2, so as not to interfere with the environment beyond the shuttle. The alternating retraction in the extension directions enables the directional use of the shuttle 542.

The retractable arms 621a,b, 623a,b are each provided with engagement elements 618 adapted to slide on the guide elements 610. According to one embodiment, these engagement elements are in the form of fixed wheels. Thus, when the engagement elements 618 are engaged in one of the corresponding guide elements 610, the arm 621a,b, 623a,b on which the engagement elements 618 are located is forced by the guide element 610 to follow a straight path. In the examples of FIGS. 14a to 15, each arm 621a,b, 623a,b comprises two engagement elements 618. It is possible, however, for each arm to contain only one engagement element 618, or more than two. The engagement elements could be of various shapes depending on the shape of the guide element 610.

During the movement of the gripper 606 between the retracted position and one of the protruding positions, one arm of the pair of arms 620*a* follows the straight path C2' on its guide element 610, and the other arm follows a path C3*a* that is less than the half-path C2' on its guide element 610, followed by a path C3*b* that is less than the half-path C2 which causes a retracting rotational movement. Each of the guide elements 610 travels a path C5 that is less than a base depth PN of the shuttle 542. In the embodiment of FIGS. 14*a* to 15, path C5 is longer than path C2.

The following description expands on the kinematics of the extension system 587 when the gripper 606 is set in motion in the first extension direction AT1, from the retracted position to the first protruding position (sequential positions illustrated in FIGS. 14*a*, *b*, *c*). The movement of the gripper 606 in the second extension direction AT2, from the retracted position to the second protruding position, is carried out according to similar kinematics and will not be detailed for the sake of brevity. Only the kinematics of the pair of retractable arms 620*a* will be described, as those for the pair of retractable arms 620*b* are identical.

More particularly, the travel of the gripper 606 along the first extension direction AT1 results from the translation of the first arm 621*a* in the first extension direction AT1 along the guide element 610. In FIG. 14*a*, the first arm 621*a* is at a first end of the guide element 610 associated with it. In FIG. 14*b*, the first arm 621*a* is at an intermediate position of the guide element 610 associated with it. In FIG. 14*c*, the first arm 621*a* is at a second end of the guide element 610 associated with it. This second end is coincident with an edge of the base 608 in order to cause the gripper 606 to project.

During the half-path C2' of the gripper 606 in the first extension direction AT1 between the retracted position and the first protruding position, the second arm 623*a* travels path C3*a* in translation along a portion of the element guide 610 associated with it, then leaves the guide element 610 and is rotated about its axis of rotation AR2*a* in a clockwise direction of rotation (arrows F13 illustrated in FIG. 14*b*) during its rectilinear movement (path C3*b*) until the end of path C2 (or half-path C2'). When it is released from the guide means 610, the second arm 623*a* is rotated by the biasing of a prestressed spring 630, for example a coil spring.

One pair of rollers 641*a* (respectively 643*a*) per arm 621*a* (resp. 623*a*) is provided on the base 608. One pair of rollers 641*b* (resp. 643*b*) per arm 621*b* (resp. 623*b*) is also provided on the base 608. As illustrated in FIG. 14*b*, when arm 623*a* is deployed by the force from the prestressed spring 630, it comes to bear on the rollers 643*a* (first one, then both as the rotation continues) associated with them. The pairs of rollers 641*a*, 643*a* are therefore a means for guiding the arms in rotation when the arms are disengaged from the translational guiding means 610, because they prevent too much of a rotation. Other embodiments of the guide means are also possible.

The continuation of the movement of the gripper 606 to the first protruding position is illustrated in FIG. 14*c*. The first arm 621*a* continues its straight path due to its engagement in the guide means 610 associated with it. This movement allows the second arm 623*a* to continue its rotation about axis AR2*a* while advancing along the transverse axis AT in the first extension direction AT2 until it ceases to be in contact with one of the two rollers. When the first arm 621 has reached the end of path C2 along the guide element 610, the gripper 606 reaches the first protruding position, and the second arm 623*a* is in the retracted position. The second arm 623*a* has moved from a rectilinear position along the transverse axis AT to an angular position relative to the transverse axis AT.

When the gripper 606 returns to the retracted position by moving in the second extension direction AT2, the first and second arms 621*a*, 623*a* perform a reverse movement to that described above. The first arm 621*a* remains engaged in its guide element 610 and follows the straight half-path C2' in the second extension direction AT2, the second arm 623*a* undergoes a reverse rotation, counterclockwise about axis AR2*a*, the second arm 623*a* comes in contact with the rollers as the gripper 606 moves in the second extension direction AT2 along path C3*b*, until realigning with the transverse axis AT and possibly engaging the engagement elements 618 in the guide element 610 associated with it.

During a movement towards the second protruding position (second extension direction AT2), the movement of the arms will alternate: the second arm 623*a* will remain constrained to a rectilinear movement by the associated guide element 610, and the first arm 621*a* will retract by clockwise rotation about axis AR1*a*.

The extension system 587 and the alternating retraction of the arms thus allows a bidirectional reversibility of the movement of the gripper 606 along the shuttle 542. The extension system 587 can offer the advantage of comprising fewer parts and being more durable, particularly due to the reduction of the moment arm during the extension of the extension system 587, resulting in a reduction of the force transmitted to the guide elements of the gripper 606 in the shuttle 542.

In the two embodiments of the extension system, the movement of the extension system 87, 587 on the guide elements 110, 610 of the base 108, 608 is achieved, according to one embodiment, by a system of toothed belts 115 (respectively 615) connected to the extension system 87, and toothed pulleys 114 (resp. 614) connected to the base 108, 608 and actuated to rotate by an actuator 116. The actuator 116 is controlled by the control unit UC. The actuator 116 ensures the synchronous rotation of the toothed pulleys 114, which causes the toothed belts 115 (resp. 615) to rotate, and therefore a movement of the extension system 87, 587. However, the extension system 87, 587 could be implemented in different ways, with more or fewer gear wheels or belts. According to one embodiment, the extension system is ensured by actuating cylinders.

Due to the extension system 87, 587 described above and having two opposite extended positions, a single extension system 87, 587 allows access to storage spaces 38 arranged face to face with the transport shuttle 42, 542 separating them. In addition, this extension system 87, 587 allows access to these opposite storage spaces 38 without rotation of the transport shuttle 42, 542, which saves space and makes it possible to make the module 10 more compact. However, it is possible that the extension system 87, 587 can only access the first or the second of the storage areas 34, 36. This could be the case when the module 10 contains only one of the storage areas 34, 36. This could also be the case if the transport shuttle 42, 542 includes two extension systems, each allowing the gripper 106, 606 to access a storage area 34, 36 specific to it. In this case, the extension system could have the same characteristics as described above, but would only move between the neutral position and the first extended position.

Figure 12:
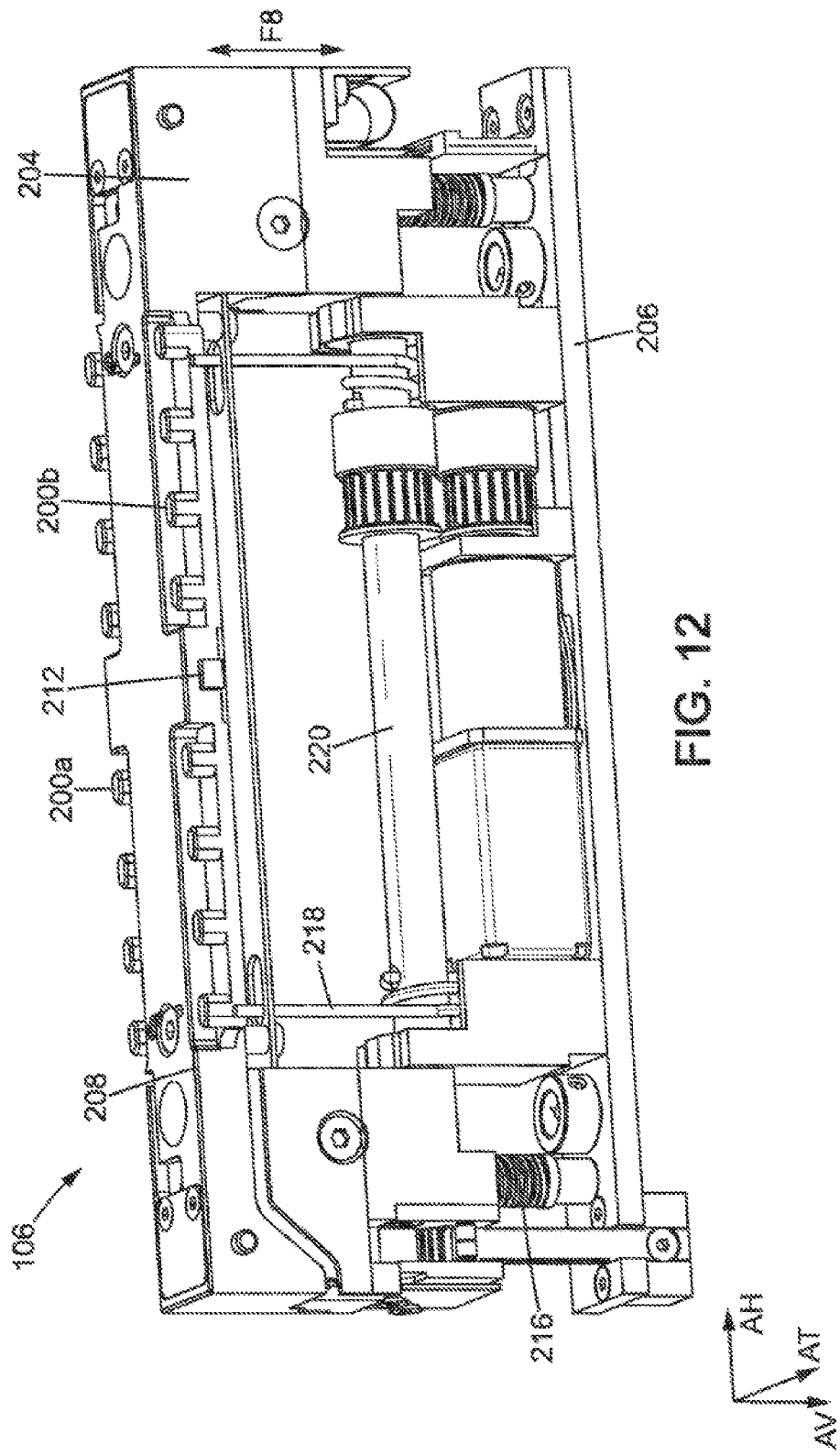
FIG. 12 is a schematic perspective view of a gripper of the shuttle of FIGS. 9 and 10, according to a first embodiment.

Referring more particularly to FIG. 12, a first embodiment of the gripper 106 for bringing (and/or removing) the removable support 60 to (from) the transport shuttle 42 will be described. A second embodiment of the gripper 606 will be described in relation to FIG. 16. The following description of gripper 106 applies to gripper 606 except for its actuation mechanism, which will be described in detail for each of the two embodiments of the gripper. Although gripper 606 is described in relation to the second embodiment of shuttle 542, it is possible for gripper 606 to be associated with shuttle 42. Similarly, although gripper 106 is described in relation to the first embodiment of shuttle 42, gripper 106 could be associated with the second embodiment of shuttle 542.

Gripper 106 will be described below as constituting a male part engaging with a female part of the removable support 60. However, it is possible that gripper 106 does not provide a mechanical connection but, for example, a magnetic connection (the gripper could be a magnet which would cooperate with a metal element of the removable support). It is also possible that the male and female parts are reversed between the shuttle 42 and the removable support 60.

The gripper 106 extends in a longitudinal direction perpendicular to the transverse axis AT; in other words the gripper 106 extends along the horizontal axis AH. According to one embodiment, the gripper 106 includes a plurality of catches 200a,b engaging with respective vertical recesses 202a,b of the removable support 60 (visible in the close-up of FIG. 11). The plurality of catches 200a,b is arranged on a support 204 that is movable along the vertical axis AV (arrow F8) relative to a base 206 of the gripper 106. The movable support 204 and the base 206 of the gripper 106 extend along the horizontal axis AH, and are arranged vertically relative to one another. The base 206 is connected to an end 112 of the extension system 87 (FIG. 10). The plurality of catches 200a,b is arranged on a longitudinal edge 208 of the movable support 204 so as to be able to come in contact with an edge 210 of the removable support 60 where the vertical recesses 202 are located. The edge 210 where the vertical recesses 202a,b are located is different from the opposite edges 94 which slide on the brackets 88.

The plurality of catches 200a,b extends vertically from the movable support 204. In the example of the figures, there are two rows of catches 200a,b (one on each longitudinal edge of the movable support 204) in order to be able to hold on to a removable support 60 when it is located in any of the opposite storage areas 34, 36 (due to the reversible movement of the extension system 87). Thus, if the transport shuttle 42 is only intended to reach storage spaces arranged on the same side, the gripper 106 could have catches only on a longitudinal edge of the movable support 204 which is facing these storage spaces.

In the example of the figures, the catches 200a,b are dimensioned for insertion into the vertical recesses 202a,b of the removable support 60. However, it is conceivable for them to engage with holes in the removable support 60. Other modes for the connection between the gripper 106 and the removable support 60 are also possible.

To increase the stability of the hooking of the removable support 60 to the transport shuttle 42, the gripper 106 optionally includes a latch 212a,b (one on each longitudinal edge of the movable support 204). In the example of the figures, the latches 212a,b extend along the transverse axis AT, and are movable between a withdrawn position where the latches 212a,b are not inserted into a corresponding transverse recess 214a,b (only one being shown in FIG. 11) of the removable support 60, and a locking position where the latches 212a,b are pressed into the corresponding transverse recess 214a,b (depending on which side of the gripper 106 is used). The latches 212a,b are actuated by an actuator, for example a coil.

Thus, when the gripper 106 is connected to the removable support 60, the catches 200a (respectively 200b) vertically enter the vertical recesses 202a (resp. 202b) of the removable support 60, and the latch 212a (resp. 212b) transversely enters the transverse recess 214a (resp. 214b) of the removable support 60.

In order to press the catches 200a,b vertically into the vertical recesses 202a,b of the removable support 60, an actuator moves the movable support 204 vertically relative to the base 206 of the gripper 106 in a hooking direction, in other words by moving the movable support 204 away from the base 206 of the gripper 106. In the embodiment illustrated in FIG. 12, this actuator comprises a spring 216 prestressed towards the hooking direction of the removable support 60. To return the movable support 204 to a position unhooked from the removable support 60, in other words where the movable support 204 is proximal to the base 206 of the gripper 106, a system where a wire 218 is rewound on a cylinder 220 rotated by an actuator is conceivable in this embodiment.

In the embodiment of FIG. 16, the gripper 606 is similar to gripper 106 and in particular comprises a plurality of catches 700a,b engaging with the respective vertical recesses 202a,b of the removable support 60. The plurality of catches 700a,b is arranged on a support 704 that is movable along the vertical axis AV (arrow F8) relative to a base 706 of the gripper 606. The catches 700a,b, movable support 704, and base 706 are similar to those described for gripper 106.

The actuator of the gripper 606 comprises a guide element 717, a spring 716, and a connecting rod system 718 in order to move the movable support 704 relative to the base 706. The spring 716 is prestressed towards the hooking direction AV1 of the removable support 60. The return of the movable support 704 to a position unhooked from the removable support 60 (in an unhooking direction AV2), where the movable support 704 is in contact with the base 706 of the gripper 606, is produced by the rotation of the connecting rod system 718 by an actuator. According to one embodiment, the actuator is actuator 116. According to one embodiment, the actuator is controlled by the control unit UC. The connecting rod system 718 is arranged laterally to the gripper 606, so that the rotation of the connecting rods of the system 718 operates in the transverse plane PT. The connecting rod system 718 is integral with the guide element 717 engaging with wheels 719 arranged on longitudinal ends 612 of the movable support 704. The connecting rod system 718 comprises a plurality of connecting rods 718a which, when actuated to rotate, move the movable support 704 in the direction of the base 706. In the specific embodiment shown in FIG. 16, the connecting rod system 718 comprises two connecting rods 718a. In an advantageous embodiment, an equal number of connecting rods are also provided on the opposite side of the shuttle 542, in order to balance the action of the connecting rod system 718 during vertical movement of the movable support 704. The connecting rods of the connecting rod system 718 operate synchronously due to the actuator. According to one embodiment, a position sensor 718b is provided at a hinge of the connecting rod 718a in order to improve the control of the connecting rod system 718. The connecting rod system 718 can have better wear durability than the rewinding wire 218. The arrangement of the connecting rod system 718 can allow moving the power supply and related electronic devices on the lateral edges of the shuttle 542.

The connecting rod system 718 can have better wear durability than the rewinding wire 218. The arrangement of the connecting rod system 718 can allow moving the power supply and related electronic devices on the lateral edges of the shuttle 542.

According to one embodiment, a distance sensor 705 is provided on each of the ends of the receiving base 585 of the transport shuttle 542. For example, the sensor 705 could be located below a longitudinal end of the movable support 704 in order to measure the distance between the base 608 and the movable support 704 and control the vertical movement of the latter.

Actuation of the gripper 606 is as follows. The following description also applies to shuttle 42 and to gripper 106. When the transport shuttle 542 is arranged facing a removable support 60 resting on a pair of supporting elements 66, the control unit UC sends an order to place the gripper at the level of the removable support 60. The gripper 606 is moved by moving the extension system 587 relative to the receiving base 586 of the transport shuttle 542 and then by deploying the extension system 587. When the gripper is at the level of the removable support 60, the catches 700a (or 700b depending on the case) are vertically located slightly below the recesses 202b (respectively 202b). The control unit UC then orders the hooking of the removable support 60 by the gripper: the movable support 704 of the gripper 606 moves vertically upwards so as to push the catches 700a (resp. 700b) into the recesses 214a (resp. 214b) under the effect of the prestressed spring 716. The latch 212a (resp. 212b) is then moved transversely in order to engage the transverse recess 214a (resp. 214b) of the removable support 60. Thus hooked, the extension system 587 is actuated in the opposite direction so as to move the removable support 60 towards the receiving base 586 of the transport shuttle 542 as described above, by means of the connecting rod system 718.

In the embodiment illustrated in the figures, the removable supports 60 have the recesses 202a,b on two opposite edges 210 so that the transport shuttle 542 can take the removable supports 60 from either of these two opposite sides 210. This is the case for example when the extension system 87 serves opposite storage areas 34, 36.

According to one example, the transport shuttle 542 can be controlled by the control unit UC to collect a removable support 60 containing a good 12 deposited in the service hatch 54 by the user of the module 10. The extension system 587 is thus deployed in the first extension direction AT1 towards the service hatch 54 which is located in the second storage area 36, until the first extended position is reached. The gripper 606 is then located at the level of an edge 210 of the removable support 60 (deposited in the service hatch 54), slightly below the recesses 202a with the catches 700a being located at the level of the recesses 202a. The movable support 704 of the gripper 606 is then set in motion vertically relative to the base 706 so that the catches 700a enter the vertical recesses 202a of the removable support 60. The latch 212a is then set in motion so that it is inserted into the transverse recess 204a of the edge 210 of the removable support 60. The control unit UC controls the movement of the extension system 587 in the second extension direction AT2 (opposite to the previous direction) until the removable support 60 is generally centered transversely on the receiving base 586. The extension system 587 thus transitions from the first extended position to the neutral position, then towards the second extended position into a position which allows the removable support 60 to be generally centered transversely on the receiving base 586. By the movement of the gripper 606 along the transverse axis AT, the removable support 60 slides on the brackets 88 in the second extension direction AT2. When the removable support is generally centered transversely on the receiving base 586, the control unit UC can control the gripper 606 to disconnect from the removable support 60. The movable support 704 comes back to rest against the base 706 of the gripper 106 (proximal position), and the height of the gripper 606 is then such that it can be movable along the transverse axis AT while remaining vertically below the removable support 60 (and therefore the receiving base 586). The control unit UC controls the movement of the shuttle 542 so that it is positioned facing, for example, a pair of supporting elements 66 of the first storage area 34 (therefore transversely opposite to the service hatch 54). This movement may occur before the gripper 606 is disconnected from the removable support 60, to maintain the removable support 60—shuttle 542 connection during the movement of the shuttle. The extension system 587 is then actuated to move the removable support 60 in the second extension direction AT2 so that the removable support 60 is accommodated on the supporting elements 66. To do this, the control unit UC controls the extension system 587 to deploy in the first extension direction AT1 to reach the first extended position, or slightly before this position so that the catches 700b are located at the level of the vertical recesses 202b of the other side 210 of the removable support 60. The gripper 606 is then actuated to engage the catches 700b with the vertical recesses 202b, in the same manner as described above. The control unit UC then controls the movement of the extension system 587 in the second extension direction AT2 so that the removable support 60 slides from the receiving base 586 towards the supporting elements 66. The extension system 587 thus transitions from the first extended position to the neutral position and continues towards the second extended position, still generally moving in the second extension direction AT2. Once the removable support 60 is in the supporting elements 66, the gripper 606 is disconnected from the removable support 60 and moved until it has returned for example to the neutral position.

Referring now to FIG. 13, a portion of the transport shuttle 42 will be described which makes it compatible with removable supports 60 of various sizes. The following description of the shuttle 42 is applicable to shuttle 542, but will not be repeated or illustrated for shuttle 542, in particular for the sake of brevity. It is conceivable that the transport shuttle 42 (or 542) does not have this portion and can accommodate only one size of removable support 60.

In this embodiment, the receiving base 86 is adapted to receive removable supports 60 of the first size (of a first width L1) and of the second size (of a second width L2). The receiving base 86 is adjustable between a first position where the receiving base 86 has a first span E1 to accommodate removable supports 61a of the first size (illustrated in FIG. 9), and a second position where the receiving base 86 has a second span E2 to accommodate removable supports 61b of the second size, the second span E2 being larger than the first span E1 (illustrated in FIG. 13). The spans are calculated as the distances between the brackets 88 along the horizontal axis AH. The different sizes of removable supports 61a, 61b are illustrated in FIGS. 2 and 4. It is conceivable that the shuttle 42 can accommodate more than two sizes of removable supports, and that the receiving base can have more than two spans.

In the embodiment illustrated in the figures, the receiving base 86 is extendable by moving the brackets 88 laterally (arrow F9) along the horizontal axis AH, in order to move them further apart or closer together according to the size of the removable support 61a, 61b. The control unit UC controls the movement of the brackets 88 on slides 221 arranged on the base 108. As the brackets 88 are connected to the vertical rails 46 (as illustrated more clearly in FIG. 5), they are moved along the horizontal axis AH with respect to each other, carrying the brackets 88 along with them, when the transport shuttle 42 is to receive a removable support 60 of a different size than the previous one.

In the second position of the receiving base 86, the brackets 88 are further apart than in the first position in order to receive the second size of removable support 61b which is larger than the first size. It may be that the receiving base 86 has three or more positions to accommodate different sizes of removable supports 61a, 61b. It may also be that the receiving base 86 has only one position to accommodate only one size of removable support 60. In this case, the receiving base 86 would not be adjustable. It is also possible that the transport shuttle 42 is oriented with respect to the storage areas 34 and/ 36 such that it can accommodate two or more sizes of removable support 60 without the receiving base 86 being adjustable.

With reference to FIG. 17 according to another embodiment of the module 300 comprises a plurality of chambers 302 separated by partitions 304. One or more of these chambers 302 may be temperature-controlled. The chambers 302 which are temperature-controlled are at least partially thermally insulated, and are heated or cooled to be at the desired temperature and adjusted over time. The temperature-controlled chambers 302 make it possible to store goods having different temperature requirements, such as fresh produce and frozen products for example. The chambers 302 each comprise dynamic shelving areas 305a,b,c similar to the dynamic shelving areas 56 of module 10 (they will not be described again in detail). Thus, each chamber 302 may include one or more storage areas. The control unit UC will select the storing of goods 12 in one or the other of the chambers 302, based on the temperature at which the goods 12 should preferably be stored.

In the example illustrated in FIG. 174, the module 300 comprises three temperature-controlled chambers 302 arranged vertically relative to one another, and separated by horizontal partitions 304. The partitions 304 provide at least partial thermal insulation. In another embodiment, it is conceivable that the chambers 302 are arranged horizontally relative to one another, and separated by vertical partitions 304. It is also possible that the module 300 includes only one, or two, or more than three temperature-controlled chambers 302. It is possible that the module 300 includes temperature-controlled chambers and others at ambient temperature. It is also possible that the module 300 includes one or more temperature-controlled chambers which do not extend for the entire height or the entire length of the module 300.

In the example of FIG. 17, a first chamber 306a is at ambient temperature T1 (not controlled), a second chamber 306b is arranged vertically above the first chamber 306a and is at a controlled temperature T2, and a third chamber 306c is arranged vertically above the second chamber 306b and is at a controlled temperature T3. The third temperature may, for example, vary between about +4 C and +30 C for the storage of books or dishes for example. The second temperature may, for example, be around +2 C for the storage of fresh produce for example. The first temperature may, for example, be around −22 C for the storage of frozen products for example.

The chambers 306a, 306b, 306c are arranged in this example so as to form a monotonic vertical temperature gradient, going from coldest to warmest from the bottom to the top. The formation of a monotonic gradient can reduce heat loss. In addition, an arrangement from coldest to warmest from the bottom to the top can make good use of the flows of cold air which gravitate downwards when a warmer zone is in contact with a colder zone. However, it is conceivable that the chambers 306a, 306b, 306c are not arranged in a temperature gradient, or that the temperature gradient is in a different order (for example from warmest to coldest from the bottom to the top), or is not monotonic. The third chamber 306c could, for example, be interposed between the first chamber 306a and the second sub-chamber 306b.

The module 300 includes an interaction window 307 and a service hatch 308, which are similar to interaction window 16 and service hatch 54 of module 10 (they will therefore not be described again in detail). According to one embodiment, in order to keep the goods at a certain temperature, the service hatch 308 may have the opening 76 coincident with the closable interaction window 16.

The interaction window 307 is illustrated as being positioned in the second chamber 306b, but it could also be positioned in any of the other chambers 306a,c, or even between two chambers 306a,b,c at their partition 304.

According to the embodiment illustrated in the figures, the service hatch 308 is movable and moves within a vertical movement passage 313 from one chamber 306a,b,c to the other. According to the illustrated embodiment, it is connected to a winch 311 in order to move vertically from the interaction window 307 to the chambers 306a,b,c. Other ways of moving the service hatch 311 are conceivable, for example such as moving on rails.

The partitions 304 have selectively closable openings 310 to allow the passage of the service hatch 308 between the chambers 306a,b,c. According to the embodiment illustrated in the figures, the openings 310 can be closed by sliding doors 318. The presence of selective openings 310 in the partitions 304 can allow passage of the service hatch 308 while reducing a temperature loss due to the passage of the service hatch 308 between the chambers 306a,b,c which are then in communication. Therefore, the openings 310 are preferably the size of the service hatch 308 to the extent possible. However, it may be that for certain embodiments, the service hatch 308 is fixed and the openings 310 are larger in order to allow the passage of the transport shuttle 42 (respectively 542) and the corresponding movement rails. The service hatch 308 is, according to one embodiment, thermally insulated in order to minimize heat loss between the temperature-controlled chambers 302 during the passage of the service hatch 308.

In the example illustrated in the figures, the opening of the partition 304 takes place when the service hatch 308 reaches the partition 304, and closes when the service hatch 308 moves away from the partition 304. In certain embodiments, when the opening 310 is closed, an air current could still pass between adjacent chambers 302 via this partition 304 (in other words not completely closed). In other embodiments, when the selective opening is closed, the chambers 302 are airtight or almost airtight with respect to each other.

In the embodiment illustrated in the figures, the module 300 comprises one transport system 312a,b,c per chamber 306a,b,c, each able to be in communication with the movable service hatch 308. The transport systems 312*a,b,c* are each similar to transport system 32, and therefore will not be described again in detail. Each transport system 312*a,b,c* includes a transport shuttle 314*a,b,c* and movement rails 316*a,b,c* allowing the movement of the transport shuttle 314*a,b,c* along vertical AV and horizontal AH axes within its chamber 306*a,b,c* (arrows F10 and F11 respectively). Each transport system 312*a,b,c* thus routes goods 12 to and from the service hatch 308 when the hatch is located in the corresponding chamber 306*a,b,c* and the dynamic shelving areas of this chamber.

The sliding doors 318 may be actuated mechanically by contact with the service hatch 308. In another embodiment, the sliding doors 318 may be actuated by a motor which is triggered when the service hatch 308 is detected, for example by a presence sensor, such as detecting proximity to the sliding door 318 concerned. The control unit could control the opening and closing of the sliding doors 318. According to another example, the selective openings could be curtains of plastic strips which would be pushed by the passage of the service hatch 308. According to another embodiment, the doors would be pivoting doors.

According to another embodiment (not illustrated), the doors 318 would be removable panels fitted on the service hatch when the latter moves from one room to another.

According to another embodiment, the service hatch 308 could be fixed and the module 300 comprises only a single transport system 312 for accessing the storage spaces of the three chambers 306*a,b,c*. The partitions 304 would thus have selective openings to allow the passage of the transport shuttle and the movable rails of the transport system.

According to another embodiment, the service hatch 308 could be fixed and placed at the partition between two chambers, so that one side of the service hatch serves one of the chambers and another side serves the other chamber. One of the two chambers (or both) could be temperature-controlled.

The modules 10, 300 are automated systems. The storage and distribution of the good 12 is taken care of automatically from the moment the good 12 is deposited in the service hatch 54, 308 by the user. The control unit UC is programmed to transport and store the good 12 inside the module 10, 300 and to optimize the storage space of the module 10, 300 according to the size of the good 12.

An example of using the module will be described. Typically a merchant wishes to deliver a parcel of goods 12 by means of the module 10, 300. The parcel has an associated code (for example a bar code) to identify it. The code may have been communicated to the delivery person beforehand or generated when the parcel was dropped off. To deposit the parcel 12 in the module 10, 300, the delivery person comes to the interaction window 16, 307 and enters a code (or scans the bar code) to identify the parcel 12 and open the interaction window 16, 307. Either of transport shuttles 42 or 542 and their alternatives could be used.

The control unit UC controls the movement of the transport shuttle 42 (or 542) in order to fetch an empty removable support 60. The empty removable supports 60 may for example be in a storage space as illustrated in FIG. 4. If the module 10, 300 accommodates several sizes of removable supports 61*a*, 61*b*, the control unit UC may choose a removable support 61*a*, 61*b* corresponding to the size of the parcel, which would have been predefined and associated with the identification code of the parcel. The control unit UC controls the extension of the extension system 87 (respectively 587) and the vertical movement of the movable support 204 (resp. 704) to engage the catches 200*a,b* (resp. 700*a,b*) in the vertical recesses 202. The control unit UC then controls the withdrawal of the extension system 87 (resp. 587), which causes the removable support 60 to slide on the brackets 88 (resp. 588) until it is in position on the receiving base 86 (resp. 586). If different sizes of removable support 61*a*, 61*b* are accepted by the shuttle 42 (resp. 542), the control unit UC will have previously controlled the receiving base 86 (resp. 586) so that it is the size of the chosen removable support 61*a*, 61*b*, by moving the vertical rails 46 further apart/closer together in order to move the brackets 88 further apart/closer together. The control unit UC controls the movement, towards the service hatch 54, 308, of the shuttle 42 (resp. 542) on which the removable support 60 is placed.

The transport shuttle 42 (resp. 542) arrives in front of the service hatch 54, and orders the raising of the removable wall 78 if it is lowered in order to allow the transport shuttle 42 (resp. 542) to deposit the empty removable support 60 in the receiving space 74.

If the module 300 contains a movable service hatch 308, the control unit UC will have previously ordered the service hatch 308 containing the empty removable support 60 to come to the interaction window 307.

Once the removable support 60 is in the receiving space, the control unit UC controls the lowering of the removable wall 78 and the opening of the interaction window 16, 307. The delivery person can then deposit the parcel of goods 12 in the goods receiving space 74 of the service hatch 308.

If the size of the parcel is not known, the service hatch 54, 308 may include a system for measuring the dimensions of the goods, for example a beam of infrared rays, in order to determine the height of the parcel. This can also be used even if the size of the parcel is known, to identify at what level the user has placed the parcel.

Once the parcel has been deposited, the user can indicate that he or she has completed the deposit, after which the window 16, 307 closes.

If the service hatch 300 is movable, it is then moved by the control unit UC to position it in the corresponding temperature-controlled chamber 302.

The removable wall 78 of the service hatch is raised to allow the transport shuttle 42 (respectively 542) to collect the removable support 60 containing the parcel deposited in the service hatch 54, 308. The control unit UC controls the extension of the extension system 87 (resp. 587) so that the gripper 106 (resp. 606) engages the vertical recesses 202*a,b* of the removable support 60, and the retraction of the extension system 87 (resp. 587) to allow the removable support 60 containing the parcel to slide on the receiving base 86 (resp. 586).

The control unit UC, which has previously calculated the position of the storage space 38 in the storage area 34, 36 that the parcel will occupy, controls the transport shuttle 42 (resp. 542) to move to a pair of supporting elements 66 which are at a height making it possible to form, with another removable support 60 which is vertically adjacent, a storage space 38 suitable for the good (case of the movable support coming below an already existing support of the dynamic shelving area) located on the shuttle 42 (resp. 542) or else for the good already present in the dynamic shelving area 56 (case of the movable support coming above an already existing support of the dynamic shelving area).

The control unit UC controls the extension system 87 (resp. 587) to extend in a corresponding extension direction, so that the edges 94 of the removable support 60 slide on the supporting elements 66.

Once the removable support 60 is fully engaged in the supporting elements 66, the control unit UC controls the shuttle 42 (resp. 542) in another action of taking goods from the service hatch 54, 308 or else distributing goods from a dynamic shelving area 56 to the service hatch 54, 308 for distribution to the customer. The control unit UC stores in memory the location of the removable supports 60 containing the parcels 12 and the dimensions of the parcels 12, in order to be able to come collect the goods 12 when the client requests it, but also for the purposes of optimizing the space for subsequent goods deposited by the delivery person.

The various aspects of the storage and distribution module and system could be combined with one another in multiple ways. For example, the storage area of the temperature-controlled chambers may or may not have dynamic shelving areas. In another example, the temperature-controlled chambers may have storage areas that may or may not face each other. It is also conceivable to use the shuttle in a context other than that of an automated module. For example, the transport shuttle could be part of another system, not necessarily traveling on rails.

The above description is intended only as an example, and persons skilled in the art will recognize that modifications can be made to the described embodiments without departing from the scope of the disclosed invention. Other modifications which fall within the scope of the present invention will be apparent to persons skilled in the art as a revision of this description and such modifications are meant to fall within the appended claims.

The invention claimed is:

1. A shuttle for handling and transporting goods, comprising:
   a receiving base suitable for receiving a removable support for goods;
   a gripper suitable for cooperating with the removable support, the gripper being movable relative to the receiving base; and
   an extension system connected to the gripper for moving the removable support on the receiving base,
   wherein the extension system moves the gripper along a transverse axis while remaining parallel to itself between a retracted position, a first protruding position, and a second protruding position opposite the first protruding position with respect to the retracted position,
   the extension system comprising at least one pair of retractable arms rotatably connected to the gripper, a movement of said at least one pair of retractable arms being mechanically linked to the translational movement of the gripper along the transverse axis,
   each of the arms of said at least one pair of retractable arms having a rectilinear travel position along the transverse axis and an associated retracted position,
   wherein, when the gripper is in the first protruding position, a first arm of said at least one pair of retractable arms is in the rectilinear position and a second arm of said pair is in the retracted position,
   when the gripper is in the second protruding position, the first arm of said pair of retractable arms is in the retracted position and the second arm of said pair is in the rectilinear position, and
   when the gripper is in the retracted position, the first and second arms of said pair of retractable arms are in the rectilinear position.

2. The shuttle according to claim 1, wherein a longitudinal direction of the gripper is perpendicular to the transverse axis.

3. The shuttle according to claim 1, wherein:
   when the gripper is in the retracted position, the shuttle has a base depth,
   when the gripper is in the first protruding position, the shuttle has a first depth,
   when the gripper is in the second protruding position, the shuttle has a second depth,
   the base depth and the first and second depths being calculated along the transverse axis, and the first and second depths being greater than the base depth.

4. The shuttle according to claim 3, wherein the first depth is equal to the second depth.

5. The shuttle according to claim 1, further comprising at least one guide element extending along the transverse axis, the extension system being movable in translation on said at least one guide element, a length of travel of the extension system along said at least one guide element being less than the first and second depths.

6. The shuttle according to claim 5, wherein, when the extension system is at the end of its travel on said at least one guide element in a first extension direction along the transverse axis, the gripper is in the first protruding position,
   when the extension system is at the end of its travel on said at least one guide element in a second extension direction along the transverse axis, the gripper is in the second protruding position, and
   when the extension system is in the middle of its travel on said at least one guide element, the gripper is in the retracted position.

7. The shuttle according to claim 1, wherein the arms of said at least one pair of retractable arms have different positions when the gripper is near the first and second protruding positions.

8. The shuttle according to claim 5, wherein said at least one guide element comprises a guide element associated with each of the arms of said pair, the guide elements constraining each of the arms of said at least one pair along the transverse axis, each of the guide elements having a length of travel that is less than a base depth of the shuttle.

9. The shuttle according to claim 8, wherein a combined action of the guide elements constrains each of the arms of said at least one pair along the transverse axis for a length of travel that is equal to the base depth of the shuttle.

10. The shuttle according to claim 5, wherein the extension system further comprises a prestressed spring arranged between each of the two arms of said at least one pair of retractable arms and the gripper, said at least one guide element acting against the effect of the prestressed springs.

11. The shuttle according to claim 2, wherein said at least one pair of retractable arms comprises a first pair of retractable arms connected to a first half of the gripper in the longitudinal direction of the gripper, and the extension system includes a second pair of retractable arms connected to a second half of the gripper in the longitudinal direction of the gripper.

12. The shuttle according to claim 1, wherein the receiving base is adjustable between at least a first position where the receiving base has a first span along a horizontal axis in order to accommodate removable supports of a first size, and at least a second position where the receiving base has a second span along the horizontal axis in order to accommodate removable supports of a second size larger than the first, the second span being larger than the first span, the horizontal axis being perpendicular to the transverse axis.

13. The shuttle according to claim 1, wherein the gripper extends along a horizontal axis perpendicular to the transverse axis, the gripper includes a movable support that is movable along a vertical axis relative to a base of the gripper, the vertical axis being perpendicular to the horizontal axis and to the transverse axis, and when the gripper moves along the transverse axis and the movable support is close to the base, the gripper is arranged vertically below the receiving base.

14. The shuttle according to claim 2, further comprising at least one guide element extending along the transverse axis, the extension system being movable in translation on said at least one guide element, a length of travel of the extension system along said at least one guide element being less than the first and second depths.

15. The shuttle according to claim 3, further comprising at least one guide element extending along the transverse axis, the extension system being movable in translation on said at least one guide element, a length of travel of the extension system along said at least one guide element being less than the first and second depths.

16. The shuttle according to claim 4, further comprising at least one guide element extending along the transverse axis, the extension system being movable in translation on said at least one guide element, a length of travel of the extension system along said at least one guide element being less than the first and second depths.

17. The shuttle according to claim 6, wherein said at least one guide element comprises a guide element associated with each of the arms of said pair, the guide elements constraining each of the arms of said at least one pair along the transverse axis, each of the guide elements having a length of travel that is less than a base depth of the shuttle.

18. The shuttle according to claim 6, wherein the extension system further comprises a prestressed spring arranged between each of the two arms of said at least one pair of retractable arms and the gripper, said at least one guide element acting against the effect of the prestressed springs.

19. The shuttle according to claim 7, wherein the extension system further comprises a prestressed spring arranged between each of the two arms of said at least one pair of retractable arms and the gripper, said at least one guide element acting against the effect of the prestressed springs.

\* \* \* \* \*